(12) United States Patent
Dunlap et al.

(10) Patent No.: US 10,036,135 B2
(45) Date of Patent: Jul. 31, 2018

(54) METHODS AND SYSTEMS TO CONTAIN POLLUTION AND HAZARDOUS ENVIRONMENTS (CPHE)

(71) Applicants: Philip S. Dunlap, Rancho Palos Verdes, CA (US); Michael J. Muse-Fisher, Los Angeles, CA (US); Nicholas A. Trutanich, Reno, NV (US); Nathan M. Dunlap, Redondo Beach, CA (US)

(72) Inventors: Philip S. Dunlap, Rancho Palos Verdes, CA (US); Michael J. Muse-Fisher, Los Angeles, CA (US); Nicholas A. Trutanich, Reno, NV (US); Nathan M. Dunlap, Redondo Beach, CA (US)

(*) Notice: Subject to any disclaimer, the term of this patent is extended or adjusted under 35 U.S.C. 154(b) by 191 days.

(21) Appl. No.: 14/921,235

(22) Filed: Oct. 23, 2015

(65) Prior Publication Data
US 2017/0114513 A1  Apr. 27, 2017

(51) Int. Cl.
*B01D 53/22* (2006.01)
*E02B 15/08* (2006.01)
(Continued)

(52) U.S. Cl.
CPC ............ *E02B 15/0814* (2013.01); *A62C 2/06* (2013.01); *B01D 63/068* (2013.01); *C02F 1/44* (2013.01); *E02B 15/085* (2013.01); *E02B 15/0821* (2013.01); *E02B 15/0857* (2013.01); *G21F 1/10* (2013.01); *G21F 7/00* (2013.01); *C02F 2101/006* (2013.01); *C02F 2101/32* (2013.01); *C02F 2103/08* (2013.01)

(58) Field of Classification Search
CPC .... C02F 1/44; C02F 2101/32; C02F 2103/08; C02F 2101/006; G21F 1/10; G21F 7/00; B01D 63/068; E02B 15/0814; E02B 15/085; E02B 15/0857; E02B 15/0821; A62C 2/06
See application file for complete search history.

(56) References Cited

U.S. PATENT DOCUMENTS

| 1,017,486 A | 2/1912 | Williamson |
| 1,972,869 A * | 9/1934 | Charch ...................... C08J 7/04 |
| | | 427/394 |

(Continued)

FOREIGN PATENT DOCUMENTS

WO  WO 2013025827 A1 *  2/2013  ............... B32B 7/02

*Primary Examiner* — Anthony Shumate
(74) *Attorney, Agent, or Firm* — I. Michael Bak-Boychuk

(57) ABSTRACT

A membrane system isolates environment volume, contains hazards, enables detoxification, hazard removal, infrastructure restoration, and substance recovery. The flexible membrane system adjusts to advantageously shape its isolated volume and integrate existing infrastructure. Pollution and hazardous energy, including crude oil, toxic-gas, radioactive fallout, fire, and other hazards are isolated, while concurrently enabling access within the isolated volume. Pod encapsulated and readily deployed, the membrane system operates semi-autonomously, uses selective-filtering, specific gravity and substance differences to channel matter, mitigate hazards, protect the biosphere, preserve infrastructure and capture substances.

3 Claims, 13 Drawing Sheets

(51) Int. Cl.
*C02F 1/44* (2006.01)
*B01D 63/06* (2006.01)
*A62C 2/06* (2006.01)
*G21F 1/10* (2006.01)
*G21F 7/00* (2006.01)
*C02F 101/00* (2006.01)
*C02F 103/08* (2006.01)
*C02F 101/32* (2006.01)

(56) References Cited

U.S. PATENT DOCUMENTS

| | | | | |
|---|---|---|---|---|
| 2,934,096 A * | 4/1960 | Banks | ............... | F16L 11/22 138/111 |
| 3,289,415 A * | 12/1966 | Merrill | ............... | B63B 35/086 114/74 R |
| 3,389,559 A * | 6/1968 | Logan | ............... | E21B 43/0122 137/312 |
| 3,548,605 A | 5/1969 | Palucet | | |
| 3,599,434 A | 8/1971 | Missed | | |
| 3,599,590 A | 8/1971 | Rego | | |
| 3,641,771 A * | 2/1972 | Spandau | ............... | E02B 15/08 405/68 |
| 3,650,181 A | 4/1972 | Blair | | |
| 3,656,100 A | 5/1972 | Madej | | |
| 3,667,609 A * | 6/1972 | Daniel | ............... | E02B 15/10 210/242.3 |
| 3,788,079 A * | 1/1974 | Kirk | ............... | E02B 15/08 210/242.1 |
| 3,963,617 A * | 6/1976 | Kirk | ............... | E02B 15/0814 210/242.3 |
| 3,966,613 A * | 6/1976 | Kirk | ............... | B63B 35/32 210/242.3 |
| 4,048,944 A * | 9/1977 | Corgnet | ............... | B63B 22/021 114/293 |
| 4,608,179 A * | 8/1986 | Deal | ............... | B01D 21/0009 204/571 |
| 4,808,304 A * | 2/1989 | Deal | ............... | B01D 21/0009 204/649 |
| 4,935,152 A * | 6/1990 | Gonzales | ............... | E02B 15/06 210/747.6 |
| 5,146,996 A * | 9/1992 | Gainer, Jr. | ............... | A01K 74/00 169/46 |
| 5,292,433 A * | 3/1994 | Fletcher | ............... | E02B 15/106 210/170.05 |
| 5,407,301 A * | 4/1995 | Lydiard | ............... | E02B 15/08 210/242.3 |
| 5,491,018 A * | 2/1996 | Maro | ............... | C09J 7/0242 428/200 |
| 5,853,143 A | 12/1998 | Bradley et al. | | |
| 6,621,191 B1 * | 9/2003 | Nomura | ............... | H02N 1/004 251/129.01 |
| 7,920,049 B2 | 4/2011 | Dunlap | | |
| 8,412,048 B2 | 4/2013 | Dunlap | | |
| 8,534,365 B2 | 9/2013 | Dighe | | |
| 8,587,408 B1 | 11/2013 | Dunlap | | |
| 8,802,966 B2 | 8/2014 | Dunlap | | |
| 8,894,325 B2 | 11/2014 | Varney et al. | | |
| 8,947,204 B1 | 2/2015 | Dunlap | | |
| 2005/0023225 A1 * | 2/2005 | Kumpf | ............... | A01K 73/12 210/747.6 |
| 2005/0051345 A1 | 3/2005 | Calderwood et al. | | |
| 2006/0035553 A1 | 2/2006 | Bader et al. | | |
| 2006/0251203 A1 | 11/2006 | Okamura et al. | | |
| 2007/0231573 A1 | 10/2007 | Thatcher | | |
| 2009/0020065 A1 * | 1/2009 | Paz | ............... | B63B 21/26 114/295 |
| 2012/0027517 A1 * | 2/2012 | Shifferaw | ............... | E21B 43/0122 405/60 |
| 2012/0034428 A1 | 2/2012 | Clarke | | |
| 2012/0067600 A1 | 3/2012 | Bourakov et al. | | |
| 2013/0126178 A1 * | 5/2013 | Kagi | ............... | E21B 43/0122 166/335 |
| 2013/0316001 A1 * | 11/2013 | Popov | ............... | A61K 9/5015 424/490 |
| 2014/0270046 A1 | 9/2014 | Bertolotto | | |
| 2015/0176385 A1 | 1/2015 | Castillo et al. | | |
| 2015/0049852 A1 | 2/2015 | Loewen | | |
| 2015/0075653 A1 | 3/2015 | Nolt | | |
| 2015/0107029 A1 | 4/2015 | Kramer et al. | | |
| 2015/0129230 A1 | 5/2015 | Carlson et al. | | |
| 2015/0136431 A1 | 5/2015 | Ploumis et al. | | |
| 2016/0236496 A1 * | 8/2016 | Morie | ............... | B41M 5/3372 |
| 2017/0115316 A1 * | 4/2017 | Okazaki | ............... | G01N 33/92 |

* cited by examiner

FIG. 1
*View 1*

Architecture 100

| | |
|---|---|
| 01 | Natural Environment, Resources and Infrastructure |
| 10 | Pollution and Hazardous Energy |
| 20 | Membrane-System |
| | 30    *Base & Interface*    (Membrane Section) |
| | 40    *Channel*    (Membrane Section) |
| | 50    *Collect & Stabilize*    (Membrane Section) |
| | 60    *Hold & Treat*    (Membrane System) |
| 70 | Repair and Restore |
| 80 | Use-Value and Substance Initiatives |
| 90 | Recover and Restitution - Biosphere and Infrastructure |

View 2

View 3

View 31

View 33

View 34

METHODS AND SYSTEMS TO CONTAIN POLLUTION AND HAZARDOUS ENVIRONMENTS (CPHE)

BACKGROUND

The field of disclosure relates generally to a membrane system that isolates and protects the environment and infrastructures, and more specifically, to processes and methods to better control situations hostile to the environment, mitigate pollution, preserve infrastructures and capture natural resources.

In remote and inaccessible environments, such as those in which natural resources are obtained, pollution mitigation and hazard elimination systems and methods are needed. This includes, but is not limited to, oil drilling and other mining environs, such as activities in deep sea areas, lakes and rivers, remote wild lands, mountain and jungle terrain. Pollution and hazards can also threaten urban areas. The need is often in response to system failures and unanticipated situations. Historically, events have caused catastrophic pollution, major environmental damage, and loss of life, including human and biodiversity life of animals and plants. These situations have resulted in loss of natural resources, staggering costs (government, industry and individual loss), and major clean-up and restoration efforts.

The field of disclosure uses a membrane system to isolate gas and liquid volumes, such as air atmospheric and water environments, including oceans and lakes. The membrane system and methods modify conditions in the isolated environment to eliminate hazardous pollution and dangerous situations.

The features, functions, and advantages of the membrane system and methods include a lightweight, flexible membrane that operates as a semi-autonomous system. The membrane system is capable of being packaged, readily transported, rapidly deployed and self-extracted as a unit that requires little assembly.

The systems and methods include
- isolation of pollution and hazardous energy to mitigate risks to the biosphere, reduce damage to the developed infrastructure, and facilitate processes that extract value from the capture substances. The captured substances can be stabilized and held away from developed infrastructure and at a semi-submerged depth or at elevation, in the event that depth and elevation have more desirable conditions, such as advantageous weather and currents, pressure and temperature.
- containment and holding of pollution at advantageous locations, including those that facilitate consolidation of substances and refinement processes that support subsequent use of the pollution as a valued natural resource product.
- relocation and removal of pollution and hazardous energy that reduce risks. This includes containment and holding of pollution or hazardous energy in less populated and more isolated areas and at advantageous locations to reduce risks, including risk of fire, and hazards to navigation (air, sea, land) shipping and other transportation means.

As an example, without limitation, the 2010 Deepwater Horizon drilling oil-head blowout in the Gulf of Mexico resulted in catastrophic pollution, major mitigation efforts, staggering costs ($3 T), and loss of crude oil resources (900B bbl). In the deep-water incident, the oil drilling platform ($330 M) was surrounded by pollution, not only crude oil pollution, but also flammable gases; in the 1st week the platform burned and sank, thereby exacerbating and perpetuating the catastrophic event. The field of disclosure relates systems and methods that concurrently benefit 3 interests (win-win-win):
1. protect environment—the biosphere
2. protect infrastructure—developed systems
3. recover pollution—as a market resource The membrane system protects environment, minimizes damage to the infrastructure, reduces the effort needed for biosphere remediation, as well as, captures the pollution as a useful natural resource and marketable product.

In another incident, in an air environment on land, hazardous $CO^2$ gas was released in the atmosphere. Concentrated $CO^2$ gas is heavier than the mix of atmospheric air; settling, the $CO^2$ displaces the atmospheric air, including oxygen. An entire African village's population near the $CO^2$ gas-release was suffocated.

$CO^2$ and toxic gases have been released as a result of man-induced initiatives to harvest natural resources, such as, but not limited to, fracking, explosive sounding, and drilling, and geological events (e.g. earthquake, volcanic eruption, etc.). Sub-terrain gas releases occur through fissures in the Earth. The field of disclosure relates to systems and methods to isolate gas concentrations and reduce risks.

In yet other environment examples, fires burn residential areas, critical infrastructure, and resources. The membrane system and methods are used in reverse and create a gas concentration in an isolated volume that deny fire essential oxygen, reduce the intensity of the flames and extinguish the fire.

There exists unmet needs to effectively isolate environments, and limit natural spread of dangerous hazards, including pollution, toxic chemicals and destructive energy. The needs, further, address methods to reduce environment damage, repair systems and mitigate risks, including impending-loss of natural resources and infrastructures.

The disclosed method and systems show exemplary embodiments, without limitation, to contain pollution and hazardous environments and mitigate risks.

BRIEF DESCRIPTION

The field of disclosure provides a method for isolating a large environmental volume. The method includes deploying and positioning a membrane system between hazardous environments and the natural environment. The isolated volume is that volume containing a source of pollution and hazardous energy. Alternatively, the isolated volume is that volume containing a benign environment that encompasses an infrastructure or valued assets, and is threatened by external pollution or hazardous energy.

The systems and methods support processes to direct the flow of pollution, hazardous energy and constituents affecting them by channeling, collecting and consolidating fluid substances. Further, the membrane system enables removal of the pollution and hazards, as well as, the treatment and modification of the isolated environment. Without the membrane system isolation, channeling and collection processes, the pollutants and hazards spread to spoil vast areas.

In this regard, the membrane system is deployed in response to a pollution and hazardous energy incident.
- Natural-resources as pollutants are typically released with significant force. These include but are not limited to, emissions of crude oil, sub-terrain pocket gases and other fluid resources.
- Hazardous energy includes fire, those of dirty radiological bomb blast, nuclear reactor core meltdown, etc.

The base area encompasses and stands-off in distance from emission forces, blasts, hazardous energy core, as well as, the immediate projection front. The stand-off distance enables dissipation of violent near-proximity forces, and intense secondary hazards. Instead the membrane system works to manage the persistent hazard, and is engineered to withstand dissipated pollution and hazardous energy.

The membrane system supports removal of pollution and other constituent substances, as well as, enables follow-on processing and use of the substances. The membrane system preserves natural-resource value within the pollution.

The membrane system has a consolidation head that can be tied-off and separated when the consolidation head is full of pollution and when otherwise beneficial. The consolidation head supports advantageous relocation, stabilization processes, as well as, decision timelines and latencies.

The membrane system and methods enable repair and recovery of system infrastructures, concurrent with mitigation of damage to both environment and infrastructure. Further, the membrane system supports permanent sequestration and elimination of pollution and hazardous situations.

Reversed, the membrane system may be situation inverted to sustain a favorable environment within a volume and isolate external hazardous situations and pollution.

In the exemplary embodiments, without limitation, semi-autonomous self-deploying and operationally 'passive' membrane systems are illustrated. The user-operator positions the base by launching anchoring-elements and releasing a pod-stack containing a tailored membrane system. The pods sequentially un-pack, extend by gravity-weight, and the membrane system is inflated by flows and differences in molecular specific-gravities.

In liquid environments, specific gravity differences are used to float, deploy, inflate and operate the lightweight membrane system.

In air atmosphere, the membrane system is reactively launched, extracted and suspended by tethered aerostats and balloons. A weighted-base, interfaces to the ground and seals the bottom of the membrane system. Emissions and expanding flue gases further inflate the membrane system.

Operations within the membrane system are enabled by differences in specific-gravity of fluids (liquid and gas environments) and include fluidity of airborne and water-borne particulates. The membrane system enables processes which dynamically direct, channel, collect and consolidate molecules and constituent-elements.

The basic membrane system is a 'passive' system; once deployed and the base is set, it doesn't necessarily need operational power systems, controls and communications links. Nevertheless, the membrane system can be further enhanced by integrated communications and computer systems monitoring effectiveness and adjustment capabilities. Designed for operations in inhospitable environments, launch might be remotely activated; deployment-extraction and initial operations require little or no real-time human interaction.

While using the membrane system, methods provide access into the isolated volume. This includes passing between areas (e.g. the isolated volume and the external environment), as well as, passage to various positions within the isolated volume to support inspections, repairs, analysis, sampling. The path-portals also relieve forces, including natural currents and explosive blasts pressures.

The membrane system enables advantageous shaping and 3-D positioning. Shape can be advantageously adjusted, including adjustments to bend around infrastructure elements (moorings, structures, etc.). Location can be set, and holdings can be relocated. In liquid environments, depth of holdings can be advantageously adjusted. In air atmosphere, altitude of holdings can be advantageously adjusted.

For example, without limitation, a semi-submerged collection may be beneficial in the event that surface conditions have less desirable weather (e.g. hurricane), currents, or hostile environments.

The membrane system and methods can be achieved independently in various exemplary embodiments, or may be combined in yet other embodiments. Further details can be seen with reference to the following description and drawings.

BRIEF DESCRIPTION OF THE DRAWINGS

FIG. 1 (View 1) is a block diagram of the architecture of the membrane system and methods to mitigate pollution and hazardous environments.

3 and 4. In addition, 4 of 6 views reveal 'time lapse' views of a Path & Portal that changes from initially closed, to a cave-penetration. to a repair-pathway, to a tunnel passageway.

Figure 9:
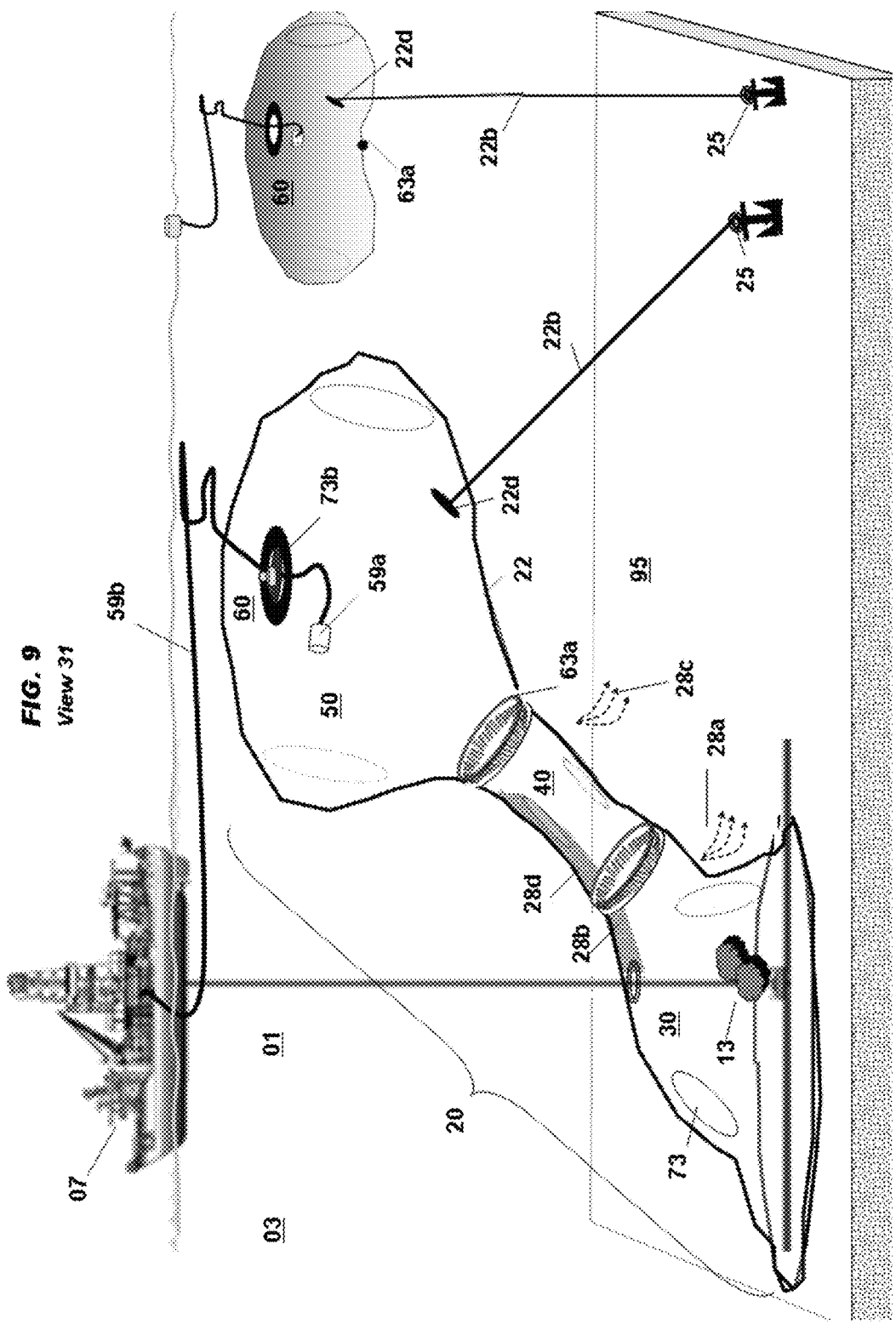

FIG. 9 (View 31) is depiction of an exemplary embodiment, without limitation, to contain crude oil pollution of a drilling ship with a drilling oil head blowout. This illustration incorporates the architecture and process flow illustrated by FIGS. 1 and 2. Without mooring lines shown in FIG. 3, this illustration is somewhat simplified and is provided for front-page illustration.

Figure 10:
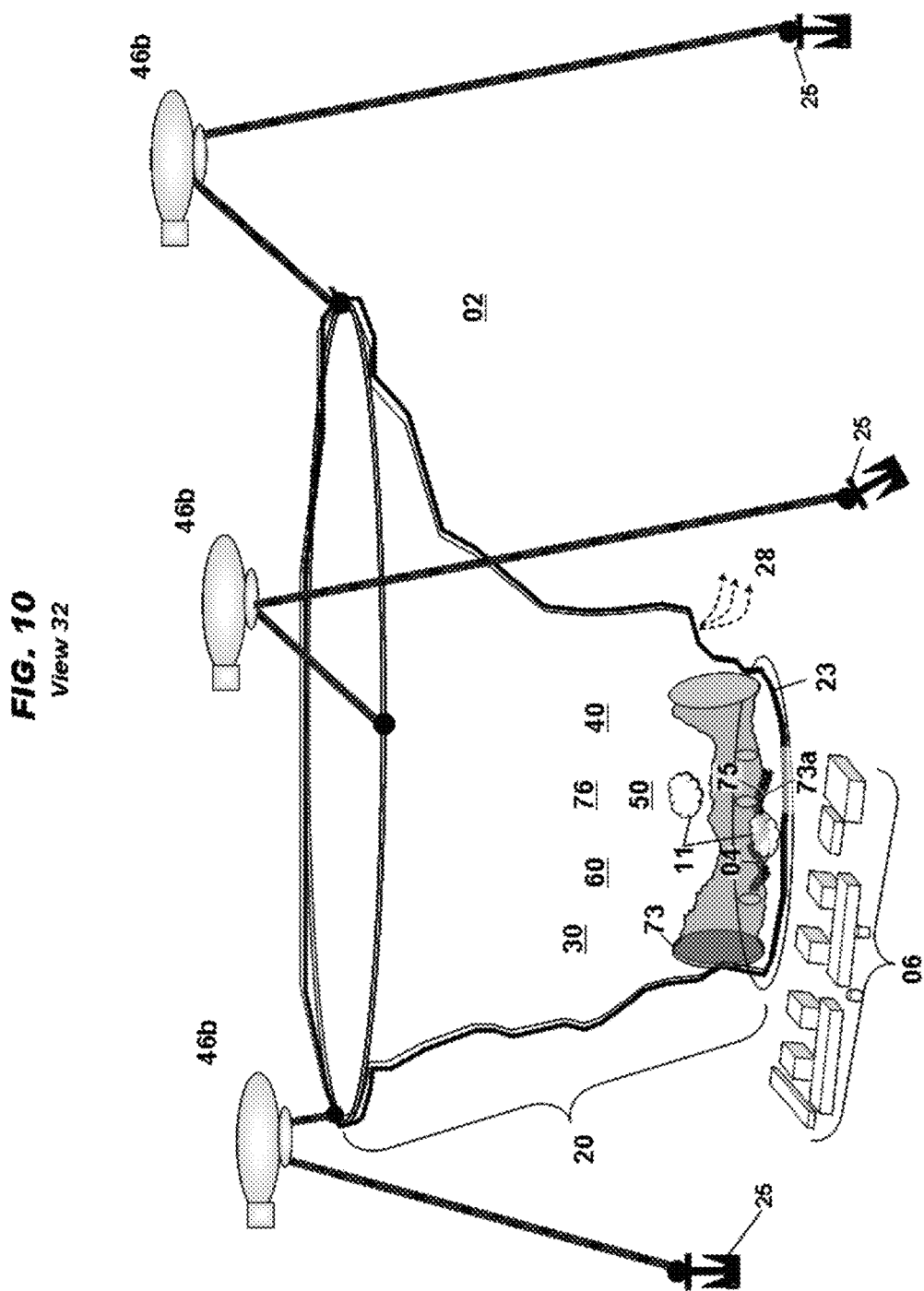

FIG. 10 (View 32) illustrates an exemplary embodiment, without limitation, using a membrane system to isolate a subterranean $CO^2$ emission release that occurs from a geological fissure. The membrane system responds to a hazardous gas released into the atmosphere near a populated area as a result of explosive fracking.

Figure 11:
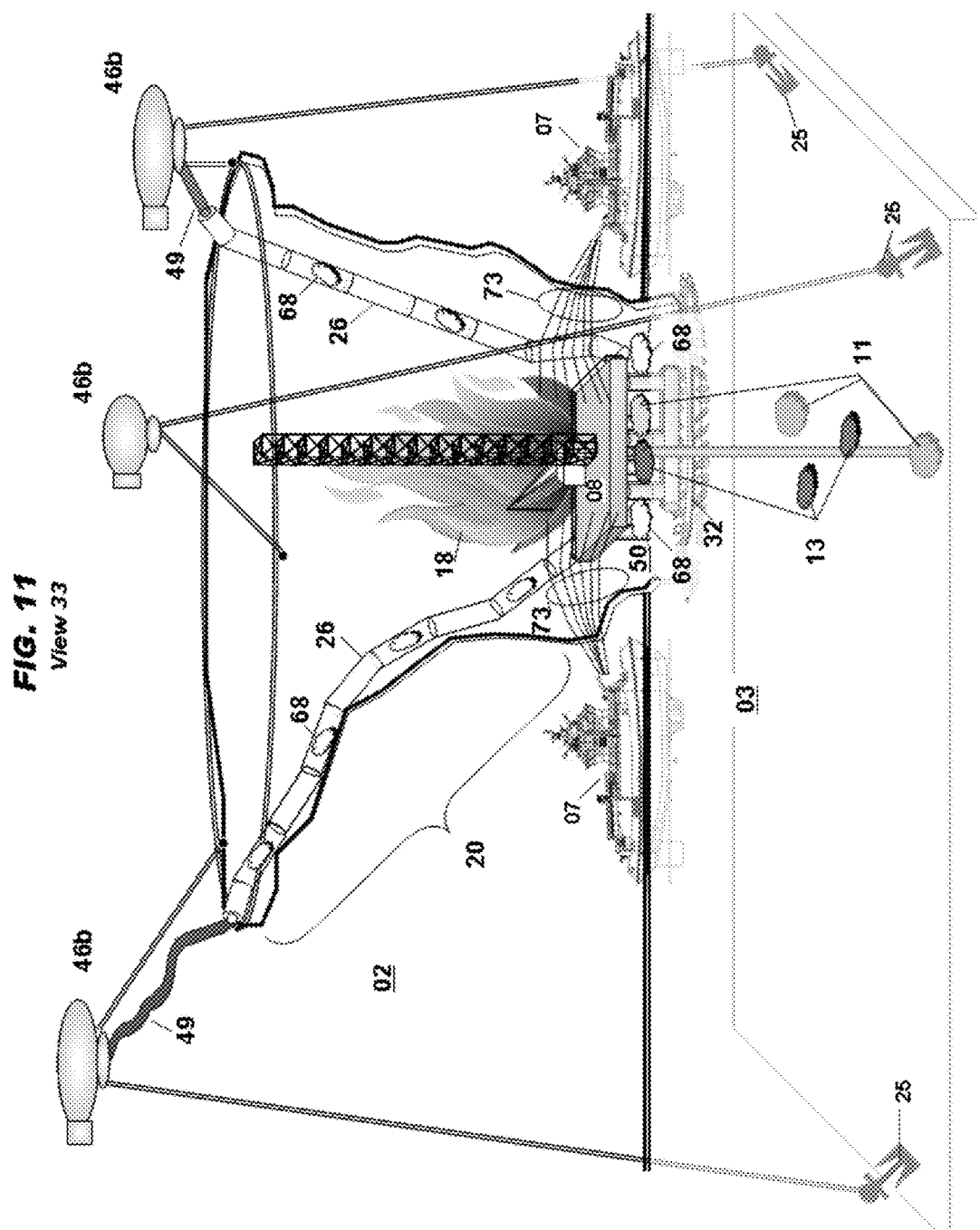

FIG. 11 (View 33) is an illustration of another exemplary embodiment, without limitation, depicting a membrane system and methods mitigating a fire hazard. The membrane system enables atmosphere modification to neutralize the fire hazard. The exemplary embodiment incorporates the architecture and process flow illustrated by FIGS. 1 and 2.

Figure 12:
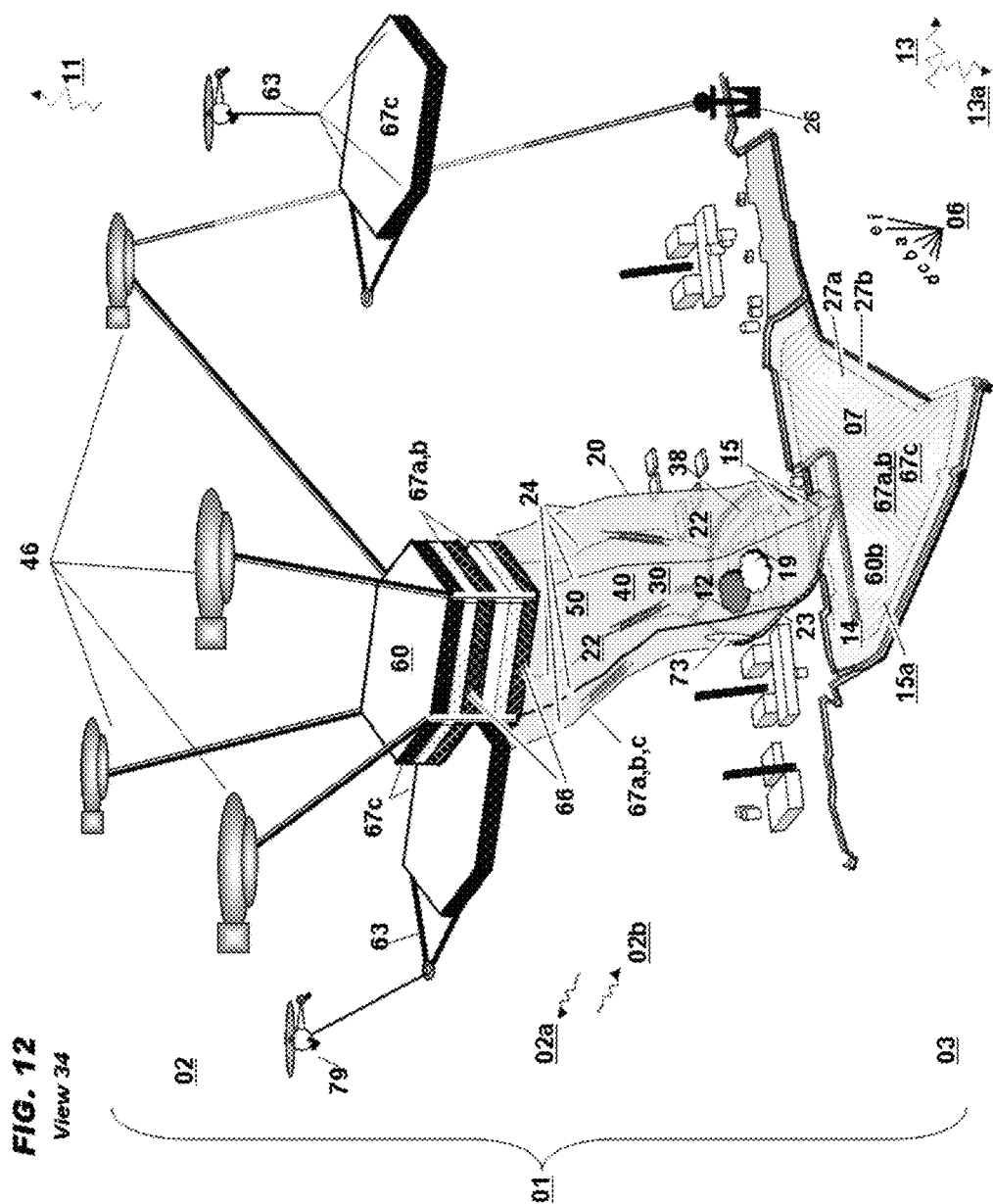

FIG. 12 (View 34) is an illustration of yet another exemplary embodiment, without limitation, depicting a membrane system and methods mitigating a nuclear power plant casualty. The drawing addresses nuclear radiation pollution in the air atmosphere and in the liquid cooling pond. The exemplary embodiment incorporates the architecture and process flow illustrated by FIGS. 1 and 2.

Figure 13:
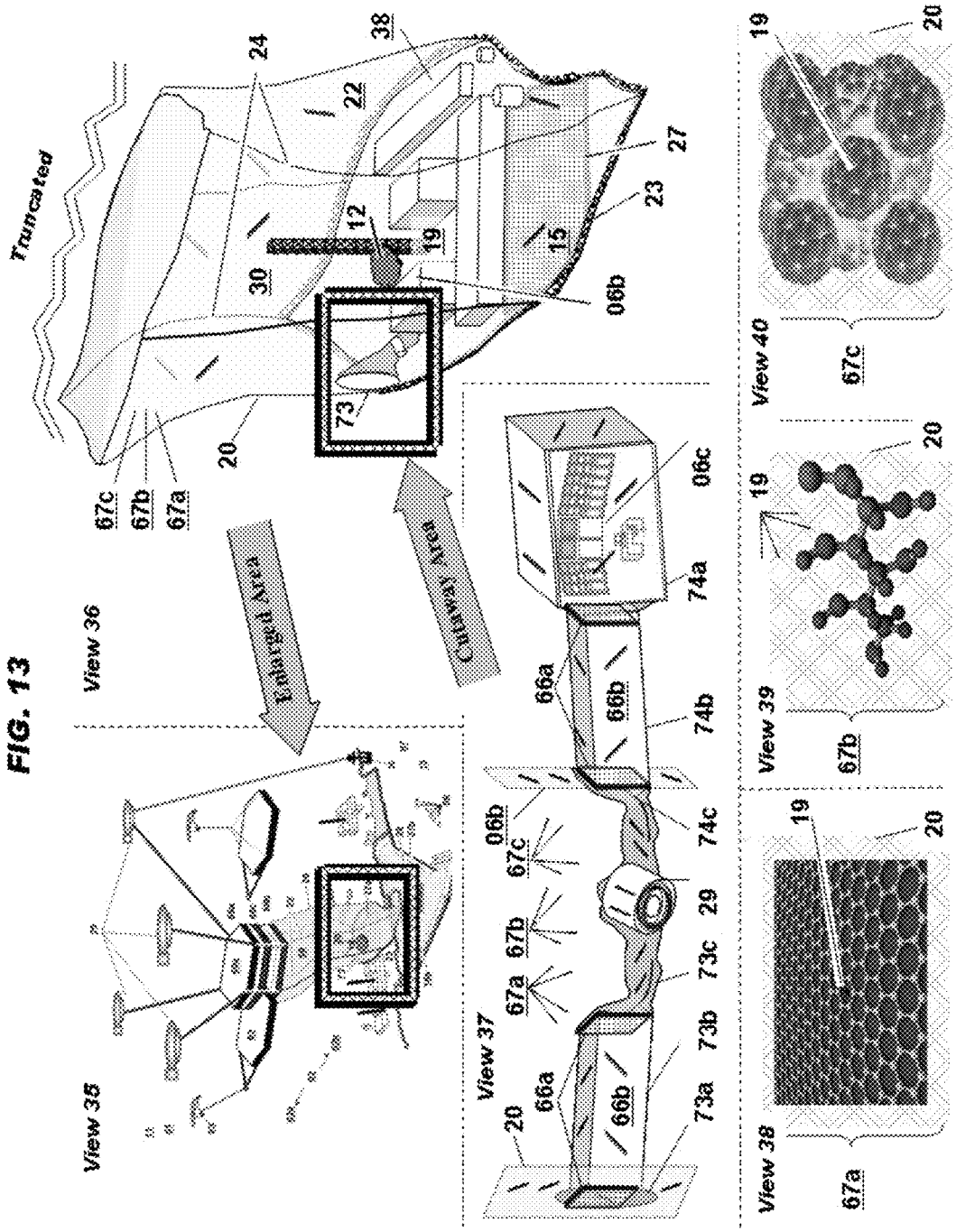

FIG. 13 (Views 35,36,37,38,39,40) illustrates exemplary embodiments, without limitation, of RADHAZ engineering considerations for the membrane system shown in FIG. 12. The six views address exemplary details of the membrane system for mitigation of radioactive emissions from a nuclear power plant casualty. Views show details for capturing airborne radioactive particles and waterborne radioactive particles. Views also address how the membrane system denies dispersal vectors and include shaping to preclude coastal diurnal shifting wind from collapsing the isolated membrane volume. An enlarged view addresses protected internal pathways that are rapidly deployed, and readily removed so that they can be sequestered. The views also show treatments details that filter, adhere, shield, bind and encapsulate particles in highly radioactive environments. The exemplary embodiment incorporates the architecture and process flow illustrated by FIGS. 1 and 2.

DETAILED DESCRIPTION

The disclosed embodiments are directed to a rapidly deployed environment isolation membrane system. The system may be a contained system, readily transported to a polluting situation or a hazardous environment needing isolation. Alternatively, membrane system elements may be already in-place and fully deployed, partially deployed or ready to be deployed. The purpose of the membrane system is to temporarily isolate an environment in a hazardous situation.

As further explained in the illustrated figures, the membrane system and methods provide integrated devices and processes for the isolation of hazards, including harnessing differences in molecular properties between those of the environment and those of pollution, as well as, the molecular differences of constituent elements affecting hazardous energy. As described with respect to the disclosed embodiments, the processes include one or more of systems and methods disclosed, including those to isolate, direct and channel pollution and other constituents, collect and consolidate pollution and hazardous elements, as well as, remove pollution, eliminate hazards, mitigate damage, capture resources, sequester hazardous toxins and the reduce hazardous situations.

Now referring to FIG. 1 (View 1), the architecture 100 for methods and system to contain pollution & hazardous environments is illustrated. This distributed architecture 100 is established in an environment 01. Within the natural environment 01 is a pollution source or hazard 10. To inhibit the natural propagation of the pollution or hazard 10, a membrane system 20 is employed. The membrane system 20 serves to separate and isolate the less polluted natural environment 01 from the spewing pollution source or spreading hazard 10 The membrane system 20 has a Base & Interface 30 section that anchors and seals the membrane system 20 and provides an interface (terrain, air or liquid interface) The membrane system 20 further Channels 40 the pollution and other constituents by using differences in molecular properties between the environment and those of pollution and hazardous energy, as well as, properties that spread and sustain the hazardous situation. The membrane system 20 then Collects and Stabilizes 50 the pollution and other constituents that affect pollution and hazardous energy spread, dissipation and hazard sustainment. The membrane system 20 inhibits unimpeded spread or dispersal by natural environment 01 forces. After consolidation 50, the membrane system 20 further serves to enable techniques to Hold and Treat 60 the pollution and matter affecting hazardous energy. Further, both the Collect & Stabilize 50 and the Hold & Treat 60 have elements that support pollution removal and other hazards elimination and treatments.

The processes and systems within architecture 100 are described in an engineered system, and include naturally occurring phenomenon (nature) within the process. In this regard, exemplary embodiments, without limitations, use the capabilities and methods described, entirely or in part, and without limitation, to derive advantages and benefits.

Further, architecture 100 includes elements to enhance system effectiveness, and support system repair and restoration 70. The repair and restoration processes addresses both systems inside the membrane volume, including those causing the pollution and hazardous situation, as well as, the external infrastructure systems including those supporting functionality (e.g. crude oil or resource harvesting, commerce transportation, etc.). With the Membrane system 20, infrastructure Repairs and Restoration 70 is conducted in a more benign natural environment, including both in the external natural environment 01, and also within the membrane system's 20 inner volume.

As shown in embodiments, without limitation, the processes, in turn, enable follow-on Residual Use-Value 80 processes, including refining the pollution, alternative use markets, and follow-on initiatives, including sequestering of pollution and toxins.

The membrane system, facilitates recovery and restitution 90 processes. These processes are conducted in an external environment 01 that is less contaminated. Further, inside the membrane system's 20 volume the greater portion of the pollution 10 has been removed, and the volume for recovery 90 treatment is substantially smaller without the natural wide-area dispersal.

Figure 2:
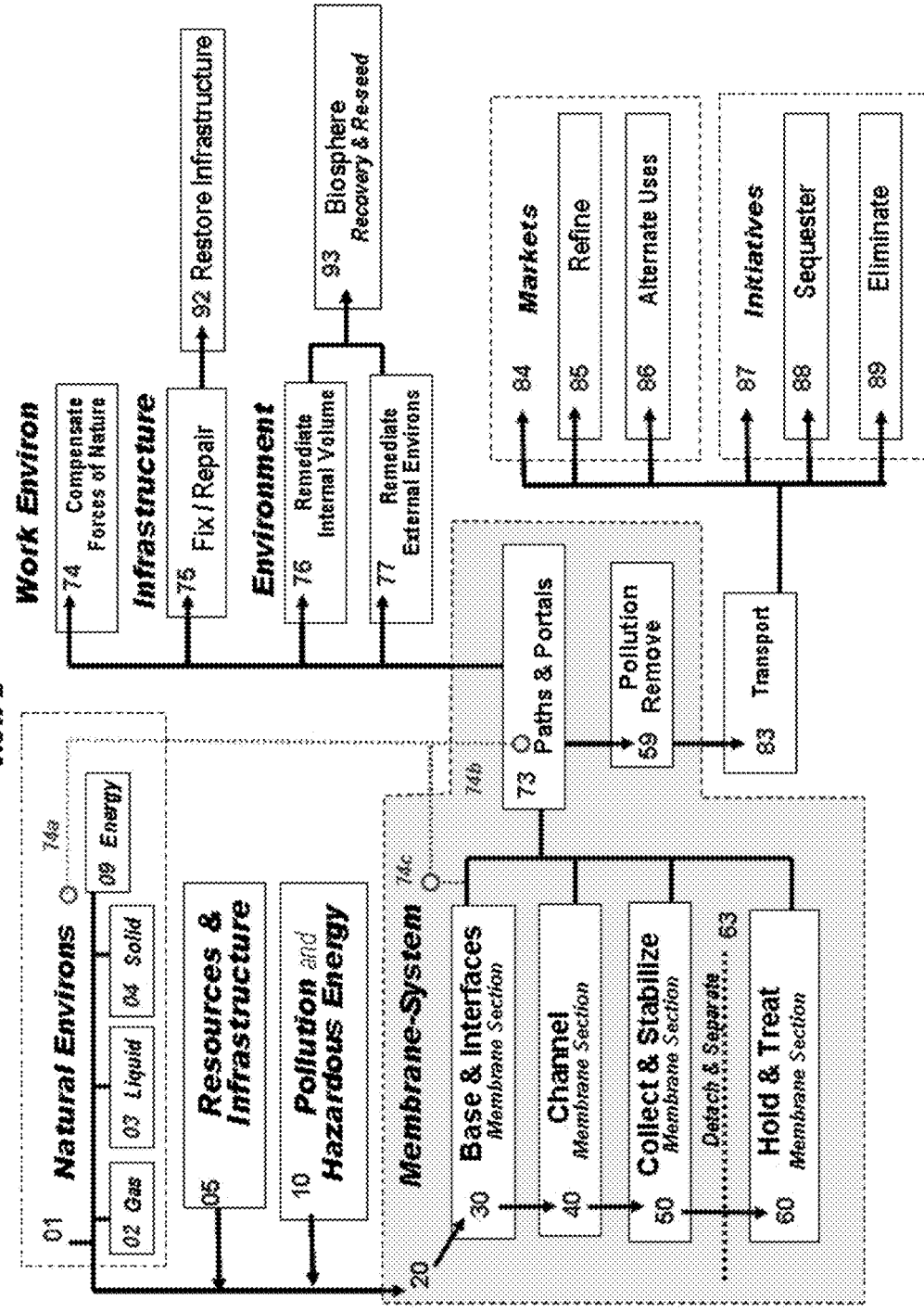
FIG. 2 (View 2) is a flowchart illustrating membrane system processes and methods to isolate, direct, channel, collect and consolidate pollution and constituents affecting hazardous environments. Also shown in the flow process are capabilities that the membrane system enables, including biosphere remediation, restoration of the infrastructure, and initiatives and user-market value that sequester, treat, and enable refinement of substances for general purpose uses.

FIG. 2 (View 2) is a flowchart 200 illustrating a process for effectively containing pollution and hazardous situations. Whether the system has been pre-deployed (totally, or in part), or is transported and reactively deployed when Pollution and Hazardous Energy 10 occurs, the membrane system 20 and processes work to contain pollution and other constituents 10.

The process flow 200 begins with natural environs 01, including gas 02, liquid 03, solid 04, and normal day to day natural energy 09, as well as, the interfaces thereof. Further, addressed is the infrastructure 05 integrated within nature's environment.

The natural environment 01 is disrupted by pollution emissions or destructive energy 10. Pollution includes, but is not limited to, subterranean resource emissions, as well as, spills and exhaust products and chemicals, as well as, radioactive fallout.

Pollution 10 includes natural resources, which if the specific-gravity is lighter, tend to rise in fluid environs such as gas 02 (e.g. the air atmosphere) and liquids 03 (e.g. oceans). For example, emissions of crude oil rises to the surface and float in the ocean. Alternatively, if the specific-gravity is heavier, the substance tends to sink. For example, sludge pollution sinks in liquids. If the emissions are left unattended, they spread over a vast area, and, in time, the natural energy environs 09 including surface actions of waves, wind, currents, as well as, sun radiation, oxidation and biological adsorption and absorption work to entrain the pollution within the agitated volume and in organic and inorganic elements of the biosphere.

While pollution molecules are often molecularly stable for lengthy periods, hazardous energy events 10 can contain both instantaneous forces, as well as, persistent energy flows that spread, consume and destroy resources and the infrastructure 05 and damage the environment 01.

The membrane system 20 provides damage mitigation of hazardous energy 10. Hazardous energies, without limitation, include heat, blast forces, pressures and other properties, including, but not limited to, fire, atomic radiation, etc. that effectively exert destructive force or insert hazardous properties on matter. The membrane system 20 enables insertion of properties to inhibit the natural vectors and spread of hazardous energy 10, as well as, buffer hazardous energy forces 10. The membrane system 20 serves to limit damage to the environment 01 and infrastructure systems 05.

Membrane system 20 flexibility also enables folding and deployment from a pod (e.g. packaged container). Once deployed, properties of the membrane system 20 enable pollution and hazardous energy 10 isolation and functional directing and channeling 40 and collection, consolidation and stabilization 50. With Base & Interface 30 anchoring and sealing, specific-gravity differences between the natural environment 01 and pollution-molecules, as well as, differences in substances with properties that advantageously affect disruptive energy forces 10 are used:

to establish an advantageous equilibrium-balance, including inflation and lifting of the membrane system 20, that displaces constituent elements and creates an energy absorbing buffer to inhibit spread of pollution and hazardous energy 10.

to channel 40 flows and collect and consolidate 50 the pollution and hazardous energy 10

Within its isolated volume, the membrane system 20 effectively inflates and floats pollution and lighter substances, or alternatively, inflates and sinks heavier-pollution and other substances.

Further, collected 50 pollution and constituents of hazards may be stabilized and treated, as well as, analyzed.

The analyze process is a cycle process to determine effectiveness, including those to fix the membrane system 20, as well as, treatments to pollution 10 and remediation and of environments 01, including remediation of both external environs 77 and internal volume 76 of the membrane system 20.

The membrane system 20 then serves to Hold and Relocate 60 hazards, and enable subsequent activities that Fix & Repair 75 damaged system and infrastructure, and remove 59 the consolidated pollution and hazards.

This includes methods to tie-off and detach 63 the head portion of the membrane system, and then relocate the Collected and Stabilized 50 pollution 10. The detaching 63 process, re-designates the Collect & Stabilize 50 membrane-section as an independent Hold & Treat 60 membrane system. It further enables attaching an empty membrane-section for Collect & Stabilize 50 processes and restores membrane system 20 functionality.

Supported by the membrane system 20, follow-on processes include Fix and Repair 76 processes, and support Residual use-value Markets 84 & substance initiatives 87, System and infrastructure restoration 92, and Biosphere environment recovery 93.

Enabled Market 84 processes refine 85 the pollution and other matter to reclaim its natural-resource value. The Collect & Stabilize membrane-section 50 and the detached Hold & Process membrane system 60 may simply be evacuated by pump and transported 83 to refineries 85 and alternative-use 86 initiatives. Alternatively, the removal 59 and transportation 83 enables other initiatives 87 including hazard substance sequestration activities 88 and hazard elimination processes 89.

Pathways & Portals 73 enable access and passage between the external environment 01 and the membrane system's 20 isolated inner volume. The Passageways and Portals 73 include hand portals, large system and human access hatches, even larger caves reaching into the inner volume, as well as, tunnels completely transiting from the exterior environment, across the isolated inner volume and exiting to the exterior environment.

Lightweight characteristics, flexibility, and other functional characteristics support dynamic-shaping of passageway-portals 73, to reach locations within the interior volume. In addition, should these characteristics be advantageous, Pathway-portals 73 provide dynamic-shaping that compensates 77a,b and c for nature forces 01, such as wind and currents, and other forces (e.g. blast pressures, etc.) that impinge on the membrane system 20. If the blast is in the isolated inner volume the Path & Portal bulges outward, if the blast is in the exterior environment, the flexible Path & Portal bulges inward.

Prior to elimination of the hazards, with the membrane system in full function, the exterior environment is a more natural environment, the boundary is better known, dynamic-shaping of the membrane enables closer approach in a more benign environment.

Further, the flexible membrane system 20 and pathways & portals 73 enable inner volume penetration. This supports repair of systems 74 in the inner volume, restoration of interior infrastructure systems 92, installation of temporary and permanent piping, jumpers and patches, as well as, remediation of the inner volume environment 75.

Within the illustrated process flow 200, the membrane system 20 supports system repairs 75, alternative system configurations (jumpers, by-pass, etc.), as well as, external and interior environment restoration 76 (interior environment) and 77 (exterior environment) and remediation processes are conducted in a more natural, more benign, and less hazardous environment 01, the pollution and hazardous energy 10 constituents are removed by Pump 59 & Transport 83 processes. The hazard is gone.

Finally the lightweight, flexible and selective-filter features of the membrane system 20 support removal of the membrane system 20 upon completion, and system restoration 92. Now, with the major portion of the pollution removed 80, the environment processes continue, including biosphere recovery and re-seed initiatives 93.

Figure 3:
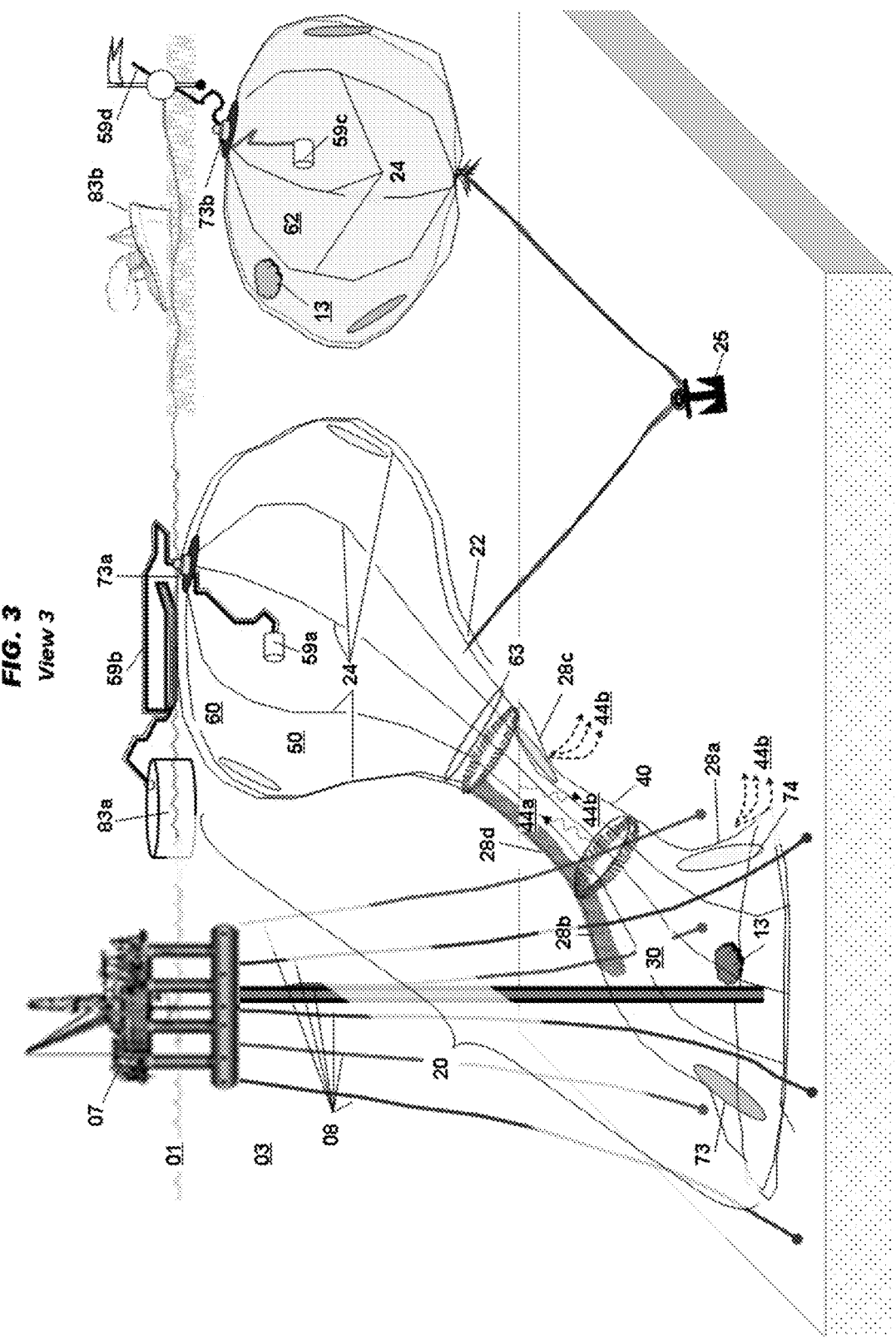
FIG. 3 (View 3) is depiction of an exemplary embodiment, without limitation, to contain crude oil pollution of a deep sea oil rig with a drilling oil head blowout. This illustration incorporates the architecture and process flow illustrated by FIGS. 1 and 2.

FIG. 3 (View 3) is one exemplary embodiment, without limitation, of a deployment of the architecture and processes illustrated by FIGS. 1 and 2. The embodiment illustrates systems and processes within a natural ocean environment 03 with a deep-sea drilling rig platform 07 and mitigation of crude oil emission pollution 13 resulting from a drilling oil head blowout.

A membrane system 20 is employed to isolate the pollution 13 from the natural ocean environment 03. The Interface & Base membrane-section 30 anchors and seals the bottom of the membrane system 20 to the ocean bottom and encompasses the pollution 13 emission source. The Base membrane-section 30 has a large perimeter and stands-off in distance from high-pressure pollution 13 emissions. The stand-off distance and large volume of the Base & Interface membrane-section 30 help to dissipate high-pressure ejection forces (pressure, velocity, mass quantity, etc.). The crude oil pollution 13 has a molecular specific-gravity lighter than the natural ocean's 03 specific-gravity, and starts to float upward within the membrane system 20. The flexible Base & Interface membrane-section 30 is a selective-filter membrane that is transmissive 28a to sea water 03 and designed to inhibit 28b crude oil 13 penetration of the membrane base 30. The Base & Interface Membrane-section 30 isolates the pollution, and resists wide dispersal. The Base & Interface Membrane-section 30 is flexible and shaped to interface the isolated volume with the infrastructure including the oil drilling derrick 07 and its drill shaft and stabilization moorings 08. The Base & Interface Membrane-section 30 is shaped by bending and cross-section narrowing to initiate gentle redirection of the rising pollution away from the oil derrick 07. The redirection of the rising crude oil pollution 13 aligns flow vectors of the flammable pollution 13 away from the oil drilling derrick 07. The resulting flow vector provides a smooth transition into the Channel 40 membrane-section.

Shaping naturally bends the membrane system 20 downwind and down-current. The membrane system 20 shaping 22 and membrane fabric transmissivity 28a,b provides relief of ocean 03 current forces exerted on the membrane system 20.

The Channel membrane-section 40 has tighter weave, smaller pore-sizes and the illustration show that the Channel 40 membrane-section has selective filtering 28a,28b,28c, and 28d. The selective-filtering enables higher-volume channeling of the rising pollution 13. With continued emission of pollution 13, the volume of crude oil pollution 13 and its lifting force increase within the membrane system 20. The flow within the channel 40 membrane-section is two way. With molecular flow and properties 44a, including lighter specific gravity floatation, viscosity, molecule glob characteristics, the crude oil 13 skims along the top of the membrane. Conversely, with molecular flow and properties 44b including heavier specific gravity, thin-viscous fluidity, water solvency and flushing characteristics, the sea water 03 sinks to lower levels, slides along the bottom of the channel fabric, passes through the selective filter 28a and 28c fabric and disperses outward.

In this regard, sinking heavier sea water 03 and rising crude oil 13 pollution within the membrane system 20 becomes less turbulent and the opposing flows (44a and 44b) become more laminar. Heavier sea water seeks to escape 44b out of the lower portion of the bottom-bend of the membrane system 20; the lighter rising pollution 13 becomes a separated adjacent counter-current 44a impinging on the high portion or the upper-bend. This causes the crude oil pollution 13 to glob and plug 28b and 28d in the pores of the upper portion of the membrane fabric, and further restricts transmissive-penetration by the rising crude oil pollution 13.

The Channel section 40 becomes less transmissive as the rising pollution 13 becomes more concentrated as the channel 40 narrows in cross-sectional area, flow-vectors 44a and 44b become more established and more defined. Less churning causes less mixing and less entrainment of substances in the flows. As a result, higher market value is sustained in the crude oil 13, and the sea water is less polluted.

There are changing depth temperature and pressure effecting molecular properties. Subterranean crude oil has heat and pressure that force its emission. In deep water, there is significant pressure, but little heat. Initially hot, crude oil substances freeze. This creates ice and crystalline solids within the flow 44a that clog pipes and systems. In this regard the membrane system 20 does not have pipes, but has a volume with a large diameter channel 40 that solid chunks will not clog.

In addition, within the rising crude oil pollution 13 there are normally entrained gases (e.g. methane) that progressively freeze; then after rising from depth, the frozen crystals thaw as temperature increases. The substances flash into gas, bubble and expand as depth and corresponding pressure decrease. The membrane system takes advantage of these phases. Frozen, the crude oil substances are blocked by the selective filter 28; as the substances transition to gas, the membrane system becomes less porous, until the Collect and Stabilize 50 membrane section has little transmissivity. Preserving natural resource value, the gas is collected in the Collect and Stabilize 50 section, and serves to inflate the membrane system 20.

While one Channel 40 membrane-section is illustrated, there can be any number of channel 40 sections linked together in series to achieve a desired length that corresponds to a membrane system 20 and achieves a needed slant 22 and ocean 03 depth.

After channeling 40, the pollution 13 continues to rise towards the surface and into the Collect & Stabilize 50 membrane-section. As sea water 03 in the upper head is displaced. The Collect & Stabilize 50 membrane-section has little or no selective-filtering of fluids (liquid or gas); neither sea water 03 transmissivity nor crude oil pollution 13 transmissivity is envisioned. Illustrated, the Collect & Stabilize 50 membrane-section has a portal 73a with a gas pressure relief valve to allow gas to be continuously removed, captured compressed, and relieve pressure in the membrane system 20. Collection and Stabilization 50 further supports consolidation of pollution by depth compression forces and flow de-acceleration. When the membrane-section 50 volume becomes 'full', it transitions to become a Hold & Treat 60 membrane-section that is still attached to the membrane system 20.

The upper sections (40, 50 & 60) are automatically extracted and inflated. Pollution 13 molecular properties (specific gravity, gaseous-pollution expansion, selective filtering) serve to consolidate the pollution 13 within and fully open the isolating membrane system 20. The consolidation 50 of the crude oil pollution in the upper head helps lift the weight of the membrane system 20.

When the Consolidation 50 section flow has ceased, and equilibrium is attained, a dynamic-balance for the Holding 60 position is established; depth factors include:
environment forces 03
   pollution lifting force of displacement, with regard to differences between sea water 03 and the crude oil pollution 13
   weight & buoyancy of the membrane system 20 including shaping & position anchors 25, as well as, cables and attachments weights.

Properties, including selective-filtering 28, enable advantageous use of lightweight and flexible membrane materials. A simple fiberglass screen fabric (400 sqft weighing 9 lbs, Home Depot ~$50) may have adequate pore size, strength, integrity under temperature, pressure and liquid-emersion, as well as flexibility characteristics adequate for the Base & Interface 30 membrane-section. As the crude oil pollution readily rises, and standing-off from the emission forces dissipates horizontal forces, The membrane system 20 merely needs to provide gentle vector steering.

The illustrated depth of the attached Hold & Treat 60 membrane-section avoids typical winds, waves, reduces sun intensity and oxidation, and helps avoid conditions that cause the pollution to spread and disperse due nature's environment. Shallow submerged position of the Hold & Treat membrane-section 60 avoids agitation entrainment of the pollution 13 within the ocean 03, evaporation of the pollution in the air, and avoids pollution penetration into porous solids. (sediment, rocks, sand, etc.). The crude oil pollution 13 is filtered 59a and removed through portal 73a (Discussed earlier, this port was also used to evacuate pollution gases) Pumping 59b and stowage 83a processes are also illustrated.

The consolidation head 50 and the Hold & Treat 60 membrane-section need strength, integrity and the capability to pump out 59b and evacuate consolidated crude oil pollution 13, potentially at the rate that the crude oil head blowout emits the pollution 13.

As shown, the consolidated crude oil pollution 13 within the Hold & Treat 60 membrane-section can be draw-string detached 63. Also shown, a tied-off, detached, and separated consolidation section is renamed to covey its stand-alone capability and the Hold & Move 62 process.

Equilibrium of a separated Hold & Move 62 membrane system that is full of consolidated crude oil pollution 13 is held at a semi-submerged depth. This equilibrium depth is adjustable to advantage, including avoidance of cyclonic conditions (hurricane, funnel spouts, tornadoes, etc.) and other severe weather; as well as, providing ocean 03 depth for sustaining pressure-force for consolidation.

FIG. 3 shows, a separated Hold & Move 62 membrane system that is ~20 meters in diameter. If 'full' of pollution, the crude oil consolidation may have tons of buoyancy (floatation displacement), and attached is a cable to an anchor 25.

Further illustrated are flexible cables 24 that cage-distribute the buoyancy force load and provide vertical and horizontal strength within a integrated Membrane system 20 and the detached Hold & Move 62 membrane system.

The membrane system 20 enables dynamic evacuation of the consolidation head 50. The portal 73b enables pumping 59b of the crude oil 13 into a ship 83b.

As discussed in FIGS. 1 and 2, this supports subsequent transport 83 and Use-Value and Substance Initiatives 80, 84 and 87.

In a situation similar to the Deepwater Horizon oil head blowout, the membrane system 20 and two supertankers might contain all 4.9 M bbls of crude oil (transfer to 20 tanks), as well as, provide ~0.9$T of crude oil market value and further save ~$3 T in government remediation costs, and $18B in awarded fines.

Statistics:
Deepwater Horizon casualty
   2010 BP Oil Spill in Gulf of Mexico
Well head blowout Depth of water 5100 ft
Blowout 20 Apr. 2010 Oil Slick observed 22 Apr. 2010
Rate: 62,000 bbls/day=2.7 M gal/day
Duration: 87 days
TOTAL Crude Oil Pollution 4.9 M bbls
   Volume=780,000 $m^3$
   Clean-up=$3 T (continuing)
   BP fines=$18. B yr. '15
   Tort=$42B (Court pending)
Crude Oil Storage
   Typical Storage Tanks ~250,000 bbls each
Transport: Supertankers capacity in bbls
   ULCC TI-class=~3 M
   VLCC=~2 M
   LR2=~1 M
   LR1=~⅝% M The crude oil is no longer pollution; it is now isolated, contained, and a consolidated natural resource. As illustrated in FIG. 2, the pumping and transport processes support markets 84 and other initiatives 87. The salvaged crude oil may need an additional refinement process 85.

Referring now back to FIG. 3, the membrane system is illustrated to work effectively as a flexible, lightweight, flow conduit that provides a temporary pipeline in which channeling and consolidation processes occur. The consolidation head 50 and the Hold & Stabilize membrane-section 60 need not ever get 'full' if the emission volume equals the extraction removal volume.

Perhaps less stressful, the integrity of the membrane system 20, remains intact in fluid dynamic equilibrium. The geological crude oil emission force and specific gravity differences provide energy for channeling 40, collection and stabilization 50 and support pumping 59b and d. The risk to infrastructure is reduced as the derrick 07 and shaft piping and moorings 08 are not engulfed in flammable pollution.

In the exemplary embodiment, adjustable submerged-depth of the upper top of the Hold & Treat 50 head and the depth of the Hold & Move 62 membrane system enable lower-risk of navigation hazards to ships 83b, as well as, lower risk to the collected pollution 13 contents and lower risk of damage to the membrane systems 20 and 62 themselves. Further, submergence also avoid severe weather (at depth), and the adjustable shaping 22 and relocation 62 capabilities facilitate crude oil pollution 13 transfer & removal pumping, tow transport and other processes.

Illustrated within FIG. 3 is flexible shaping of the membrane system, including a large base 30 to capture the crude oil pollution 13, as well as, dissipate the geological emission pressure released by the oil drilling head blowout. Shown, crude oil pollution flow is channeled 40; the crude oil pollution is collected 50 and Held 60 at an advantageous depth. Further illustrated, in the channel 40 is a detachment capability in the narrow cross-sectional area.

The flexible membrane system 20 sheers to the right. The sheer illustrates both control of shaping by anchors and deployment systems. Dynamic-shaping 22 to the situation provides adjustments to relieve the stress-forces of the natural environment 01, including ocean currents 03 and other forces. This shaping supports reduced risk of fire, contamination, and pollution ingested by service and response systems. (In the Deepwater Horizon incident, methane gas from the oil head blowout along with crude oil pollution bubbled-up from underneath, and fed an oil derrick fire that eventually sank the oil derrick platform).

By positioning the consolidated-pollution head 50 in an area that is away from the drilling rig 07 and down current 03, pollution 13 would be channeled and carried away from those working on the surface to mitigate the dangerous situation. The Collect & Stabilize 50 head and the Hold & Treat 60 membrane-section are at an advantageous position not far from the supporting oil derrick 07 and at an adjustable depth, without oxygen and thereby deny fire and explosion. The depth is shown near the ocean surface 03, yet semi-submerged to avoid environment 03, which includes wind and wave agitation and degradation of the collected crude oil 13 by evaporation, oxidation and ultraviolet light. Effectively, the membrane system is a large-diameter, soft conduit to recover the crude oil, as well as, preserve the infrastructure 07, facilitate treatment of the environment 01, and support follow-on processes that derive Use-Value.

Figure 4:
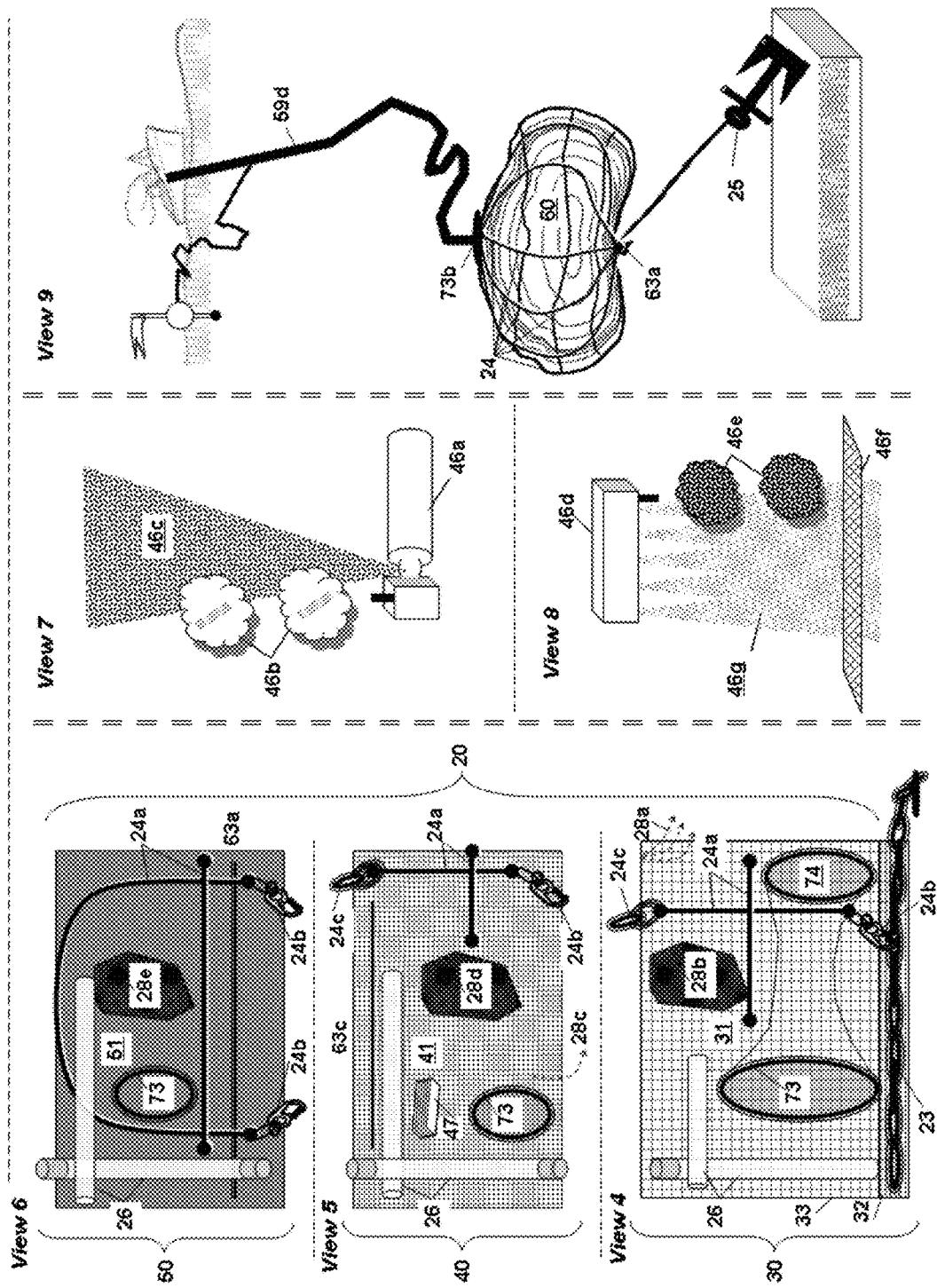
FIG. 4 (Views 4,5,6,7,8,9) illustrates exemplary embodiments, without limitation, of engineering considerations for the membrane system shown earlier in FIG. 3. The six views address exemplary details of the membrane system for mitigating emission of a crude oil pollutant with a specific-gravity that is lighter than the surrounding sea environment.

FIG. 4 provides six views (View 4,5,6,7,8,9) of an exemplary embodiment, without limitation, of some engineering considerations that support the membrane system 20 discussed in FIG. 3. The membrane system 20 engineering works to mitigate a deepwater oil head blowout casualty. FIG. 4 supports the architecture and processes illustrated by FIGS. 1 and 2.

FIG. 4 (Views 4,5,6) illustrates membrane-sections which collectively create the membrane system 20; they include the Base & Interface membrane 30, the Channel membrane-section 40, and the Collect & Stabilize membrane-section 50. Discussed first, these sections have some common features, including flexible strength cables 24a, and fastener carabineers 24b, and fastening rings 24c that strengthen the membrane system 20 and support inflation, horizontal stretch, and vertical stretch of the membrane system 20. In addition they have Flow tubes 26 that enable delivery of fluid (gas and liquid) treatments, and fluids that inflate, stiffen and shape the membrane system 20. The Flow tubes 26 have end-caps that allow quick-connections, sealing, pressure regulation/relief, and delivery of fluids to various locations within the membrane system 20. The membrane-sections (30,40,50) have Path & Portals 73 entry/exits that have closure covers. These Path & Portals 73 can be connected to create a Tunnel-thru 74, as shown in View 4, through the interior of the Membrane system 20.

FIG. 4 (Views 4,5,6) also have functional commonality features with significant differences between membrane-sections (30,40,50). These include:
Membrane characteristics 31, 41, 51
  Selective-Filtering that allows seawater transmissivity 28a (View 4) and 28c (View 5), and crude oil blockage 28b (View 4), 28d (View 5) and 28e (View 6).

FIG. 4 (View 4) also shows a membrane anchoring and sealing process 23. In this embodiment-detail, a chain at the bottom of the Base & Interface 30 membrane-section establishes the shape of the bottom circumference boundary; it anchors the lower portion of the membrane system 20. The chain need not be heavy anchor chain. The anchoring and sealing process 23 is assisted by changing buoyancy in a horizontal membrane tube behind the chain in the interface subsection 32. When the membrane system 20 is released, as it falls through the air, spring-devices open the tube and capture air, temporarily. The captured air increases positive buoyancy in water of the settling anchor chain, and allows it to be more easily pulled, opened to its circumference, and shaped to the perimeter needs. With settling of the chain anchor-weight, the buoyant air is released. The interface provides a weight-seal of the membrane system 20. Crude oil pollution, as soon as it is emitted, starts to rise and a tight base seal is not needed.

The Base & Interface 30 membrane-section properties provide for anchoring of the circumference and include consideration of buoyancy-forces, ocean floor-bottom contour roughness, and strain integral within the membrane system 20. In this illustration, the Base & Interface membrane-section 30 shows two sub-sections 32 & 33. The first sub-section helps establish the perimeter, and provides an interface 32 between the ocean floor-bottom contour and the membrane system 20 including the anchor & seal 23; it has material-strength. The second subsection is designed to dissipate 33 ejection pressure and with shaping 22 it gently bends to steer and direct the rising crude oil dispersal within the Base & Interface Section 30.

The Base & Interface 30 has design 31 provides lightweight, strong, flexible characteristics, the ability to be folded easily and efficiently, as well as, the capability to withstand ocean depth temperature and pressures, emersion in the liquid environment and chemical constituents, and selective-filtering. Potentially, without limitation, the Base & Interface 30 has a very large pore-size membrane fabric (Perhaps 2 or 3 cm). Base & Interface Section 30 characteristics include:
  (Referring to FIG. 3) isolation of the pollution 13 environment from the natural environment 01, and absorption of anticipated forces of nature between interfaces, including
  its base anchoring & buoyancy lift
  relieve of dissipation forces, both of
    (a.) pollution emissions
    (b.) sinking sea water
At deeper depth, ocean pressure is greater, the seawater is colder, there is less light, and typically there are few plants and animals. While the Base & Interface Section 30 at extreme depths has huge compression pressure, once it sinks into position, there are few moving-components other than the pollution and the displaced seawater. With the exception of depth-pressure, even environmental forces (weather, currents, etc.) are typically less forceful. The crude oil pollution with a lighter specific-gravity tends to float rapidly upward.

The Base & Interface 30 membrane-section resists crude oil penetration of the membrane. As illustrated (FIG. 4 View 4), the dissipation membrane subsection 33 has a loose grid and very large pore-sizes. While resisting penetration by crude oil pollution, the Dissipation Sub-section 33 allows sea-water to flow through the membrane grid. Membrane properties such as (a) grid size (b) horizontal ribbon-flats, (c) edge-flutes and (d) surface textures capitalize on the propensity of crude oil pollution to glob and plug-up the membrane distillation pores, (e) fixed-vents 47 (shown in View 5) that open to downward flow and blocking upward flow within the grid enable seawater to pass in horizontal and downward dissipation, as well as, support horizontal dissipation and flow of cross-currents. The fixed-vents resist the upward floatation vectors of crude oil pollution.

Referring to FIG. 4 View 5 the channeling membrane-section 40 directs the flows and channels different constituents. Crude oil pollution 13 tends to skim along the bended-top of the channel, while sea water tends to settle internally within the Channel membrane-section 40; it seeks to escape through the selective filters element 28c.

The Channel membrane-section 40 provides quick connections features 24b and 24c that enable rapid configuration. This includes adjoining to a Base & Interface 30 membrane-section, adjoining and stacking multiple Channel 40 membrane-sections, and attaching a Collect and Stabilize 50 membrane-section.

The Channel 40 membrane-section resists crude oil penetration of the membrane. As illustrated (FIG. 4 View 5), the Channel characteristics 41 include modest pore-sizes (Perhaps made of fiberglass screen material.) It resists penetration by crude oil pollution 28d, and allows some sea-water to flow 28c through the membrane-fabric grid. Fixed-vents 47 cause flowing crude oil to be pushed off the membrane fabric and to free-flow in the channel Now referring to FIG. 3, the flow of crude oil pollution 13 through the narrower channel is denser in the channeling section 40.

Referring back to FIG. 4 (View 5) the channeling membrane-section 40 is more tightly woven than the Base & Interface 30 membrane-section. Design considerations support isolation of the increased pollution density in reduced cross-sectional area in the channel. The illustrated design provides less cross-flow transmissivity. Shaping-tubes 26 support shaping; sheer-slant and narrowing of the channeling membrane-section 40 relieves strain and reduces exposure to external ocean currents and other forces. The Channel membrane-section 40 is designed to manage the increased pollution density, flow momentum, channel the rising pollution and gases, as well as, the downward flow of dissipated seawater.

Supporting Channel 40 processes, the membrane fabric 41 may be varied so that the grid size is smaller on the top of the channel's operational-slant, and larger on the bottom of the channel's operational-slant. Channel 40 orientation established and maintained by lighter fluids in flow at the top of the slant and heavier fluids in the bottom of the slant, as well as, weighted-sinkers that rotate the Channel 40 so that the larger-pore size fabric is lower. The Channel 40 also has Pathway-Ports 73

Referring to FIG. 4 (View 6) the Collect & Stabilize membrane-section 50 arrests the flotation-flow of the pollution. The lighter crude oil pollution floats and consolidates in the collection head; the sea water molecules, with heavier specific-gravity, sink.

Illustrated in FIG. 3 the collect & stabilize membrane-section 50 is at a shallow depth. More benign than the ocean's surface, the Collect & Stabilize membrane-section 50 manages weather and ocean currents, solar radiation, ocean surface actions that entrain atmospheric gases, aquatic life and other biosphere elements.

Referring back to FIG. 4 (View 6), the Collect and Stabilize Membrane-Section 50 has characteristics of low permeability, no or small pore sizes with little transmissivity 28e. Further, the Collect & Stabilize Characteristics 51 have fabric strength to manage buoyancy forces of the membrane, as well as, sustain forces both within and without the membrane. Strength-cables 24a and clamps 24b are illustrated. These forces include internal pressures including the pollution inflating the collection head, gas expansion of substances in the flow, as well as, external forces of the biosphere and natural environment.

The exemplary embodiment further shows engineering considerations shared between the Channel 40 (View 5) and Collect & Stabilize 50 (View 6) membrane-sections, illustrated is a zip detach drawstring 63a (also shown tied-off in View 9), and quick attach cable-loop 63c.

Further, illustrated in FIG. 4 (View 7 and 8), the membrane system 20 has engineering consideration for buoyancy, inflation, scrubbing, pollution velocity flow and other characteristics. The exemplary embodiment, without limitation, shows (View 7) a Positive Buoyancy device 46a, and (View 8) a Negative Buoyancy device 46d:

In FIG. 4 (View 7), the Positive Buoyancy Device 46a adds buoyancy 46b and c, and provides control of upward flow velocity. In the illustration, small bubbles 46c are released by the device 46a to create current and push pollution molecules rapidly upward. In addition to the rising flow velocity, the small air bubble expansion works to clean and scrub the membrane system's inner surfaces. The gas bubbles work to inflate the membrane system and provide positive-buoyancy. The encapsulated gas-puffs with +Buoyancy 46b provide additional control. Capsules are designed to expand and rise to the top, expand and burst at a designated depth. Other capsules have encapsulation that dissolves and releases the gas over time. In addition, the gas-puff capsules 46b may also have valves that compensate for desired buoyancy and depth pressure changes as well as use volumetric expansion to adjust buoyancy features.

Also shown in FIG. 4 (View 8) is a device to add weight and adjust negative-buoyancy 46d. The device releases particles 46g that have mass-weight (e.g. sand) to decelerate rising pollution flow velocity. The sand particles 46g sift through the catch net 46f and settle to the ocean bottom; they do not add displacement weight. Further shown in View 8 are encapsulated mass-weight capsules that provides negative buoyancy 46e and add displacement-weight to the Membrane system 20. As shown in FIG. 3, the membrane system 20 has no floor but rather a circumference Base Anchor & Seal 23 interfaces to the bottom of the ocean floor to close the isolated membrane system volume; Referring back to FIG. 4 (View 8), to add displacement-weight to the Membrane system 20, the encapsulated negative-buoyancy weight 46e is caught by a catch-net 46f. The encapsulation capabilities include those that persist, and those that dissolve with time and allow particles to sift through the catch net 46f. Buoyancy increases as the particles within the negative-buoyancy encasements 46e are released and sift through the catch-net sieve 46f.

FIG. 4 View 9 illustrates a Hold & Treat 60 membrane system. Both the Membrane system 20 (View 4), and the separated Hold & Relocate 60 membrane system (View 9) have capabilities to manage buoyancy, as well as, shape, location and submerged depth.

View 9 shows at the bottom of the Hold & Treat 60 membrane system a gathered, sealed and tied-off detachment point 63a. In addition, horizontal and vertical strength cables 24 serve to cage the Hold & Treat 60 system and fittings enable its relocation towing.

Whether the Collect & Stabilize 50 membrane-section is an integral part of the overall Membrane System 20 that contains membrane-sections (30,40,50), or is detached and separated 60 as shown (View 9), the pollution is contained and held.

Both the integrated Membrane system 20, which contains all the membrane-sections (30,40,50), and a separated Hold & Treat 60 membrane system have capabilities for Path-portals 73 that enable access and passage through the isolated volumes. As illustrated (FIG. 4 View 9) a portal 73b provides access to insert a tap-fitting and elements to support crude oil pollution pumping 59d and removal in the Hold & Relocate 64 membrane system.

Figure 5:
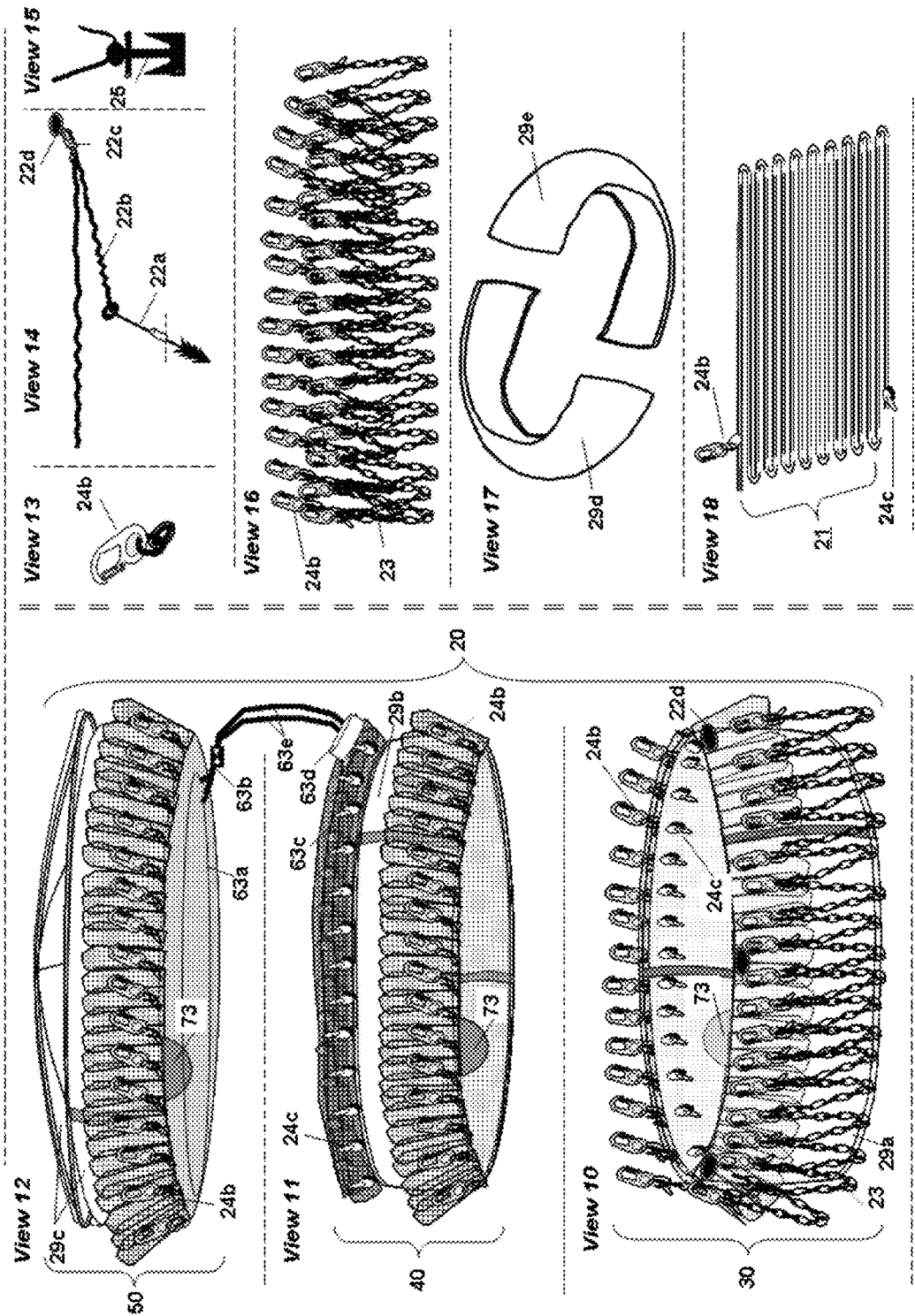
FIG. 5 (Views 10,11,12,13,14,15,16,17,18,) illustrates exemplary embodiments, without limitation, of Encapsulation Pods and Attachments for the membrane system shown earlier in FIGS. 3 and 4. The nine views address exemplary details supporting packaging and rapid assembly of the membrane system components.

FIG. 5 provides nine Views (Views 10, 11, 12, 13, 14, 15, 16, 17, 18) of an exemplary embodiment, without limitation, of Pod Encapsulation and quick Attach/Detach capabilities that support the membrane system 20 discussed in FIGS. 3 and 4. Integrating Views 10,11,12, the membrane system 20 Pod encapsulation and attach/detach capabilities support rapid response to mitigate a deepwater oil head blowout casualty. FIG. 5 supports the architecture and processes illustrated by FIGS. 1 and 2.

FIG. 5 (Views 10,11,12) illustrates membrane-section pods which assemble and when deployed collectively create the membrane system 20; they include a Base & Interface membrane 30 and its encapsulation pod 29a, a Channel membrane-section 40 and its encapsulation pod 29b, and a Collect & Stabilize membrane-section 50 and its encapsulation pod 29c.

Discussed first, these sections have common features, including flexible strength cables and fastener carabineers 24b, and fastening rings 24c. The membrane-sections (30, 40,50) have Path & Portal 73 entry/exit that have closure covers.

FIG. 5 (View 10) shows an Base & Interface 30 encapsulation pod 29a. In this embodiment-detail, a simple chain 23 is looped and attached by quick-clamps 24b to the Base & Interface 30 membrane-section. While the chain 23 is envisioned, without limitation, to have ~2 or 3-inch links (like security chain), the entire perimeter-length (potentially >150 feet) has significant weight and is shown in a pre-launch configuration. View 10 shows it attached to the Base & Interface 30 encapsulation pod 29a. (View 16 shows it unattached.) Fastening rings 24c are shown in View 10 ready to quickly attach the Channel 40 membrane-section. In addition, a reinforced attachment point and ring 22d is integrated into the upper top of the Base & Interface 30 membrane-section to help shape and fit the Membrane System 20 and support its integration to the oil drilling derrick, support moorings, and to shape an advantageous position for wind and currents, shipping traffic, response activities, etc.

FIG. 5 (View 11) shows a Channel 40 encapsulation pod 29b. In this embodiment-detail, quick-clamps 24b are used to rapidly attach to the Base & Interface 30 membrane-section's fastening rings 24c. Integrated within the membrane-fabric design are pleats and a strength cable that as the Channel 40 becomes inflated, the cable clinches the pleats to the outside of the attached Base & Interface 30 membrane. The rapid fastening capability serves to configure and stack multiple channel 40 sections in series, and tailor the Membrane System 20 to a desired ocean depth. (The Deepwater Horizon casualty was at 5100 ft depth.)

FIG. 5 (View 12) shows a Collect & Stabilize 50 encapsulation pod 29c. In this embodiment-detail, quick-clamps 24b are used to rapidly attach to Channel 40 membrane-section's fastening rings 24c. Also shown are pleats and a strength cable that flop-down and clinch the outside of Channel 40 membrane.

FIG. 5 View 11 and 12 shows an exemplary embodiment of pod encapsulation features shared between the Channel 40 (View 11) and Collect & Stabilize 50 (View 12) membrane-sections. Illustrated is a zip drawstring 63a (also shown tied-off in View 9), a drawstring lock 63b, a pull-thru loop 63c, a strain management and detachment mechanism 63d, and a separation lanyard/leash 63e. These devices serve to close a full Collect & Stabilize 50 membrane-section, separate it to become a Hold & Treat 60 membrane system, temporary leash a separated full Hold & Treat 60 membrane system, and support attachment of a new (empty) Collect & Stabilize 50 membrane-section.

FIG. 5 (View 13) shows a carabineer quick-clamp 24b that readily snaps on.

FIG. 5 (View 14) shows a harpoon-anchor 22a with a slip ring 22c and a quick-clamp, a perimeter tensioning cable 22b that is affixed to the Base & Interface 30 membrane attachment point 22d (also shown View 10). The bitter end of the perimeter tensioning cable 22b leads to tensioning capstans (perhaps on the oil derrick) and vessels (ship, boat, helicopter, submarine vessel etc.) that provide tensioning pull. Integrated into the upper portion of the Base & Interface 30 membrane-section is an attachment point and ring 22d that serve to take tension and shape the Membrane System 20, and support its integration to the oil derrick and support moorings, as well as, slant the Membrane System 20 to achieve an advantageous depth, flow direction, position for wind and currents, shipping traffic, response activities, etc.

FIG. 5 (View 15) shows an anchor 25 that sets the Membrane System shape and bend.

FIG. 5 (View 16) shows looped chain 23 and quick-clamps 24b that readily configure to the Base & Interface 30 section within its encapsulation pod 29a (shown View 10). The objective is to loop the chain and enable the tensioners to easily pull the perimeter of the Base & Interface 30 membrane-section to encompass the pollution source, as well as, accommodate infrastructure shafts, moorings etc. This is done as the membrane system is being lowered, settling, partially extracted from pods, full extracted from the pods, and fully deployed and needing adjustment . . . or perhaps pre-deployed in response to safety readiness.

FIG. 5 (View 17) shows an encapsulation shell comprised of pieces 29d and 29e. The encapsulation is compact and lightweight. It is designed to support transport and deployment means. As the pod is launched, the encapsulation design supports membrane extraction with little force, including linear pull from the top, and linear pull from the bottom. Further, the halves easily separate, and the design supports automatic extraction and inflation of the membrane system 20 by rising pollution, settling sea water, expansion of gases, as well as, expansion due to continuing pollution emission in the isolated volume.

FIG. 5 (View 18) is a sheer cutaway of pod encapsulated (29a, 29b,29c) membrane fabric presented to show folding characteristics. Within encapsulation pods (previously discussed) the lightweight membrane-section is flemished and flaked 21. Quick-clamps 24b and fastening-rings 24c are integrated at the top end and bottom ends of the membrane (Shown in Views 10, 11) The Collect & Stabilize 50 membrane-section is flaked and pleated to account for its holding bulb-top.

Figure 6:
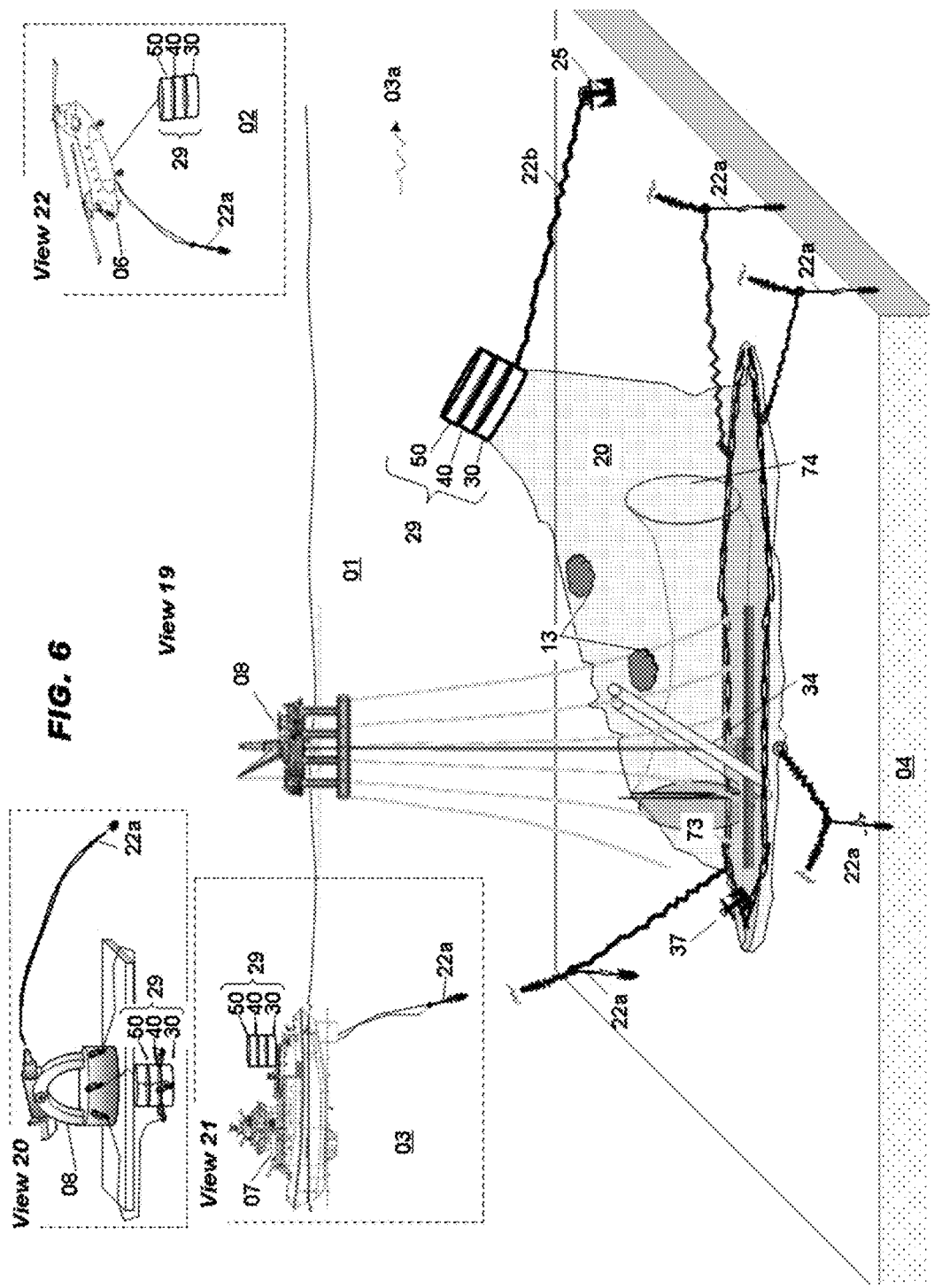
FIG. 6 (Views 19,20,21,22) depicts exemplary embodiments, without limitation, illustrating deployment of pods containing a lightweight, flexible membrane system. The four views show deployment features. A view shows that concurrent with protection of the environment, the membrane system integrates to infrastructure elements and existing moorings, and direct the flammable pollution hazard away from the oil drilling derrick. In addition, views show emergency response transportation and rapid deployment of the membrane system illustrated in FIGS. 3 and 4.

FIG. 6 provides four views (Views 19, 20, 21, 22) and shows an exemplary embodiment, without limitation, of systems and methods enabling rapid deployment of a Membrane system 20. Illustrated is a Set of Encapsulated Pods 29 comprised of three pods each containing a membrane-section (30,40, 50). These have been joined and the Base & Interface 30 is nearly completely extracted. When all the membrane-sections 30,40,50 are fully extracted and deployed, they comprise an operational lightweight and flexible Membrane system 20. The views support the exemplary embodiment discussed in FIG. 3,4,5, and the architecture and processes illustrated by FIGS. 1 and 2. The Encapsulated Pod Set 29 and deployment capabilities provide rapid response to mitigate an oil head blowout casualty.

FIG. 6 (View 19) illustrates a membrane system 20 partially deployed. The Encapsulated Pot Set 29 is readily transportable and rapidly deployed. The membrane system 20 and Encapsulation pods can have fixed elements, semi-fixed elements and responsive elements packaged for situation response. As an example, the harpoon-anchors 22a and tensioning-cables 22b can be fixed and tensioning-cables fairlead attached to the Base & Interface 30 encapsulated pod in the yet to be launched Encapsulated Pod Set 29 and the bitter end of the tensioning cable 22b attached to a capstan on the oil derrick 08. Further the membrane system 20 supports on-scene configuration adjustments.

View 19 illustrates lightweight harpoon-anchors 22a that are driven into the sediment 04 by an explosive charge that detonates upon inertial sensing impact with the ocean bottom. The explosion drives the harpoon-anchor flutes 22a into the sediment 04.

As discussed in FIG. 5 View 10 and 14 tensioning cables attached to the Base & Interface 22d are pulled to stretch the base perimeter and the sealing chain-weight 23.

Returning to FIG. 6 View 19, the tensioning-cable are led through the harpoon-anchor slip ring and the tension bitter-ends are shown truncated. Stiffening tubes 34 enable the drill shaft and pipe to penetrate a slit in the Membrane System 20. The stiffening tubes 34 inflate and close the slit and pinch-seal the vertical drill shaft and pipe. Once the perimeter chain and base have been dragged into position (around moorings and encompassing the crude oil pollution source), an anchor 37 is shown to weight-down the flat-edge of the membrane system. This anchor 37 is lowered into position (anchor's chain is not shown) to step-on the Membrane System 20 edge most likely to lift and drag.

Further, in early stages of deployment the Path and portal 73 and 74 are shown closed and the fabric of the tunnel tube is collapsed and pinned (perhaps Velcro) to the side wall.

View 19 shows that once the base perimeter encompasses the crude oil pollution 13 source the Encapsulated Pods (30, 40, 50) are self-extracting, semi-autonomously deployed and automatically inflated. The only elements touching the Encapsulated Pod Set 29 are the membrane fabric and a tensioning-cable 22a that advantageously shapes the membrane system 20 and bends the effluent and flammable crude oil pollution 13 in the channel 40 and Collect & Stabilize 50 membrane-sections away from the oil derrick 08. In this regard, both the membrane fabric and the tensioning-cable 22a & anchor 25 hold the membrane system down. The only force extracting, inflating and floating the membrane system 20 is the rising pollution 13. In addition, Pathway & Ports 73 and a tunnel exit 74 are illustrated. The tunnel is collapsed and stowed against the membrane system 20 sidewall.

FIG. 6 (View 20) shows that the Pod Set 29 can be self-deployed by the oil derrick 08 by harpoon cannons in response to a situation. The harpoon-anchor 22a is lightweight projectile and has lightweight cord (perhaps parachute cord) used to pull more stout tensioning-cables through the harpoon-anchor eyelet's slip ring.

FIG. 6 View 20 shows a Encapsulated Pod Set 29. The Pod Set 29 is initially suspended beneath the floating oil derrick's 08 platform. The pod set 29 is released in response to pollution 13 emissions. To rapidly deploy the membrane system 20 that is contained within the pod 29, harpoon-cannons appropriately shoot harpoon-anchoring elements 22a with lines. As shown in View 19 the harpoon anchoring elements were aimed in response to the situation, natural environment 01 including currents 03, and pollution 13 drift (e.g. observable oil slick).

As a situation response easy and rapid deployment characteristics, lightweight and flexible characteristics, and operationally unobtrusive deployment and employment provide advantages in emergency situations. These characteristics serve to minimize deployment regrets, enhance operational readiness, and provide low-cost demonstration and training.

Referring now to FIG. 4, if needed, a Positive Buoyancy Device 46a releases compressed gas (perhaps $CO^2$) to inflate stiffening tubes 26 and further stretch and extend the perimeter circumference of the interface subsection 32, as well as, add buoyancy and slow decent of the base anchoring chain 23 to the ocean floor. The Shaping-Tube 26 releases the shaping-gas within the tube as the perimeter-circumference became fully extended. The Base Anchor-chain & Seal 23 sink, anchoring and sealing the bottom of the Membrane system 20.

Referring now to FIG. 6, the deployment Pod Set 29 can also be transported and deployed by vessels, including ships, boats (View 21), aircrafts, and helicopters (View 22). Also, anchoring elements 22a can be set independently, and cooperatively in conjunction with cooperating entities.

When environment 01 isolation is no longer needed, lightweight and flexible characteristics support removal of the membrane system 20 by evacuating crude oil pollution 13, weighing buoyancy anchors (25 and 37), as well as, (shown in FIG. 7 View 23) slipping the tensioning cables 22b, lifting the perimeter chain anchor-weight 23, and de-pressurizing stiffener tubes 34. Using the strengthen-cables 24, then winch the membrane system aboard (similar to trawler winching a fishing net.).

Lightening the winch in-haul, sea water escapes out the unsealed base 30, as well as, the sea water that becomes entrapped in the flexible and lightweight membrane system escapes with selective filtering 28 (FIG. 3 View 3).

The membrane system is cleaned, repaired, and sections are repackaged in pod encasements (See earlier FIG. 5 Views 10,11 and 12) to be ready, when needed again.

Figure 7:
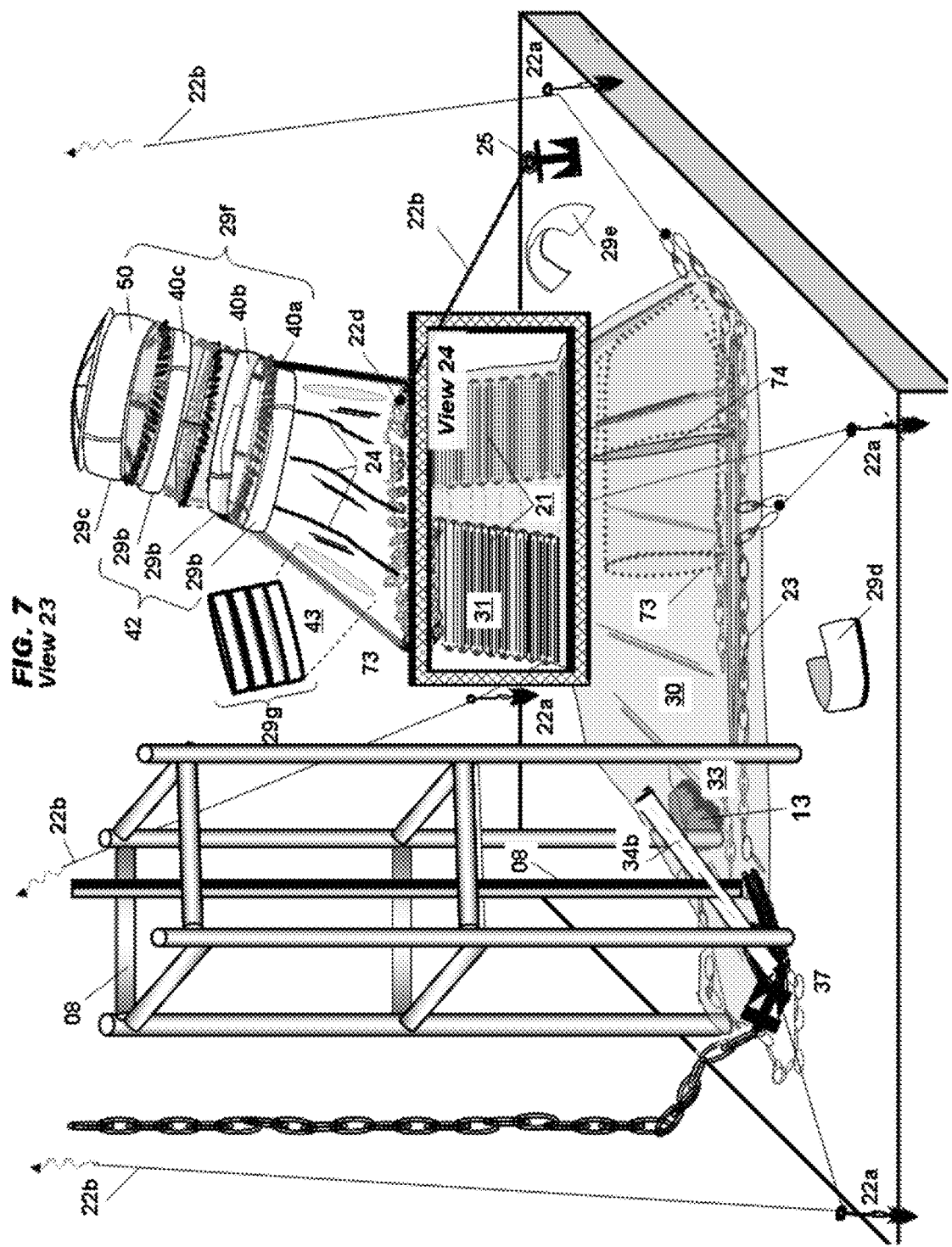
FIG. 7 (Views 23,24) depicts exemplary embodiments, without limitation, illustrating rapid tailoring of pods and internal packaging of the membrane system. The two views show stacking of pods that are quickly assembled and readily deployed to meet situation requirements (depth of water). In addition, a 'cutaway' view shows internal pod packaging supporting self-extraction and rapid deployment of the lightweight, flexible membrane system illustrated in FIGS. 3 and 4.

FIG. 7 provides two Views (Views 23, 24) and shows an exemplary embodiment, without limitation, of systems and methods enabling Membrane system 20 tailoring, stacking to accommodate ocean depth, and packaging within an encapsulation pod 29f.

FIG. 7 View 23 illustrates an enlarged View of a partial deployment of a Set of Pod 29f. Shown are two encapsulated pods halves 29d, 29e, a partially extracted Base & Interface 30 membrane-section that is attached to stacked encapsulated pods (29b,29b, 29b and 29c), each containing one membrane-section (40a, 40b, 40c, 50), respectively. The yet-to-be fully deployed pods, when extracted and deployed, comprise an operational lightweight and flexible Membrane system 20 that is tailored to the pollution 13 situation, infrastructures 08 and ocean depth. The views support the exemplary embodiment discussed in FIG. 3,4,5, and the architecture and processes illustrated by FIGS. 1 and 2.

View 23 shows an Encapsulated Pod Set 29f and deployment capabilities that provide rapid response to mitigate an oil head blowout casualty. In the process of fully deploying, the illustration is time preceded by the following sequence:

Pollution 13 event occurs and is observed

Harpoon-anchors 22a are deployed and the encapsulation pod 29f is dropped

The encapsulation pod 29f drifts down current.

Harpoon-anchors 22a become set. Tension-cables 22b, connected to the perimeter anchor-weight 23 and base of the Base & Interface 30 membrane-section, slip through the harpoon-anchor 22a eyelets as tension stretches the anchor-weight 23 and membrane interface to encompass the pollution 13 source.

Un-inflated stiffening-tubes 34*b* have a penetration-slit that enables the vertical drilling shaft 08 to penetrate the Base & Interface 30 membrane-section. As the vertical drilling shaft 08 reaches the top of the stiffening-tubes 34*b* they automatically inflate, close the penetration and pinch the drilling shaft 08. The stiffening-tubes 34*b* also serve to provide a rigid ramp that directs dispersing 33 and rising crude oil pollution 13 to flow towards, the yet to be extracted, Pod Set 29*f*. The stiffening-tubes 34*b* further preclude the rising pollution 13 from bubble-bulging the membrane fabric.

The encapsulation shell halves 29*d* and 29*e* separate and fall to the ocean floor A shaping anchor 25 with a tensioning cable 22*b* is lowered and pulls the attachment point 22*d* at the upper portion of the yet-to-be fully extracted Base & Interface 30 membrane-section. When fully opened, this provides an advantageous shape that continues to direct the flammable pollution 13 down current and away from the crude oil drilling derrick 08.

Concurrently, an anchor 37 is lowered from the oil derrick platform 08 to step-on and weight-secure the flattened edge of the Base & Interface 30 membrane-section to preclude dragging.

Paths and Portals 73 are shown closed and a tunnel and exit 74 are attached and pinned to the membrane fabric, and yet to be opened and employed.

The configuration can be adjusted. View 23 further shows a stack of encapsulated pods 29*g* that are ready to be attached to a portal 73 in the partially-extracted portion of Channel 40*a* membrane section. The ready configuration stack 29*g* can be attached prior to launch of the Set of pods 29*f*, during their extraction and inflation (shown), and to a fully deployed and operational membrane system. The stack 29*g* supports redirection 43 channeling to a ready (empty) Collect & Stabilize membrane section within the Pod Stack 29*g*.

This further enables (as discussed earlier in View 11 and View 12) detach and separation 63 of a 'full' Hold & Treat 60 membrane section. Once detached, then again, another stack of encapsulated pods (not shown) can be attached for continued 'swap-out' readiness.

View 24 is a sheer cutaway of, the yet-to-be inflated, Base & Interface 30 membrane-section. The cutaway shows flexible and foldable characteristics 21 of the membrane fabric, and flemish-flaking packaging 31 processes of the upper part of the Base & Interface 30 membrane-section. The characteristics and packaging features are common within membrane-sections 30,40,50 (shown in View 23).

View 24 shows characteristics 31 of the membrane fabric that maintains integrity and strength and are flexible, foldable, lie flat, capable of sharp bends and can be compressed and packaged in a small volume. Packaging 21 shows that the circumference-encompassing membrane is flemished and flaked by folding the fabric back and forth and laying the compressed folds flat such that they can be easily extracted and inflated with very little force.

Figure 8:
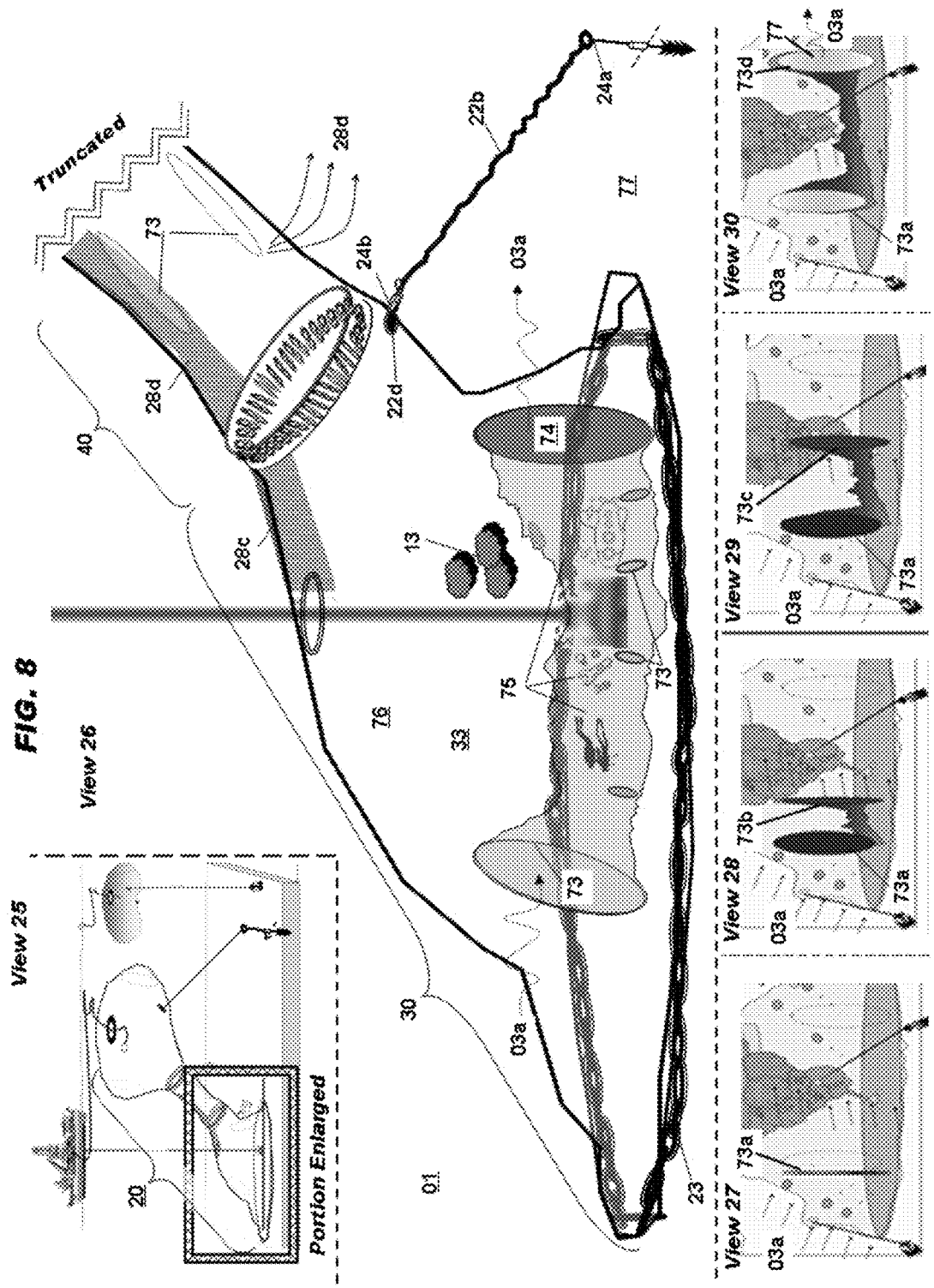
FIG. 8 (Views 25,26,27,28,29,30) illustrates exemplary embodiments, without limitation, of access within the isolated inner volume. The 6 views show Path & Portals integrated within the membrane system illustrated in FIGS.

FIG. 8 provides six views (Views 25, 26, 27, 28,29,30) and shows exemplary embodiments, without limitation, of systems and methods that provide Pathways and Portals 73 which enable entry/exit and passage through 74 the interior of a Membrane system 20. The views support the exemplary embodiment discussed in FIG. 3,4,5,6,7, and the architecture and processes illustrated by FIGS. 1 and 2. The Paths and Ports 73 and 74 provide access to fix and repair infrastructure systems, treat effluent pollution and remediate the interior volume.

View 25 shows the enlarged portion of View 26 and illustrates the portion of the membrane system 20 shown in View 26.

As shown in View 26, the passageway-portals 73 include small portal for tubes, shafts and hand-access to remove pollution, insert treatments, affect repairs and gather analysis samples. In addition, the passageway-portals 73 can be larger and enable human and vehicle/vessel access and tunnel passage 74 through the isolation membrane 20.

Shown in View 26 is an illustration of a full tunnel passing through the Base & Interface 30 membrane-section. Concurrent with Path & Portal 73 use, the Membrane System 20 processes continue to function. The embodiment illustrates that with the pollution 13 emission, dissipation 33, Channeling 40 and other processes continue to function. Extending the more benign natural environment 01, Pathway-portals 73 are flexible and enable entry and passage to points within the inner volume. The Passageway-Portals 73 support systems repair 75 including repair of the pollution emission source, environment treatment 76, search and rescue functions, and other activities within the interior volume.

The Pathway-portals 73 provide a more benign less-polluted passage that proceeds from the exterior natural environment 01 through the isolated interior center of the membrane system 20, and continues on to exit on the opposite side of the membrane system 20. The flexible tunnel supports inner system repair 75 by closely approaching the polluting crude oil head blow-out casualty and provide smaller hand access ports 73 along the tunnel length.

Passageway-Portals 73 can continue to penetrate through the isolated interior volume and enable a tunnel and exit 74. The tunnel 74 further enables automatic relief of forces that compensate 77 for natural current, over-pressure (i.e. explosion) and other forces.

View 26 shows an ocean current 03*a* that presses on Pathway-Portal 73, automatically unpins a tunnel passageway which was initially attached to the side of the membrane-fabric. The current 03*a* exits portal 74.

Infrastructure repair 75 is shown in the large Pathway-Portals 73, which illustrates access by robotic submarines, humans scuba divers and tools.

Further, shown are four Views (FIG. 8, View 27,28,29,30) that show time-lapse inflation of a Pathway-Portal 73 to create a full tunnel and exit 74

View 27 shows a passageway-portal 73*a* closed & un-deployed. The flexible, lightweight tunnel was initially collapsed and pinned to one side of the membrane system 20. The tunnel entry-portal 73*a* is experiencing force of the ocean current 03*a*

View 28 shows an entry-portal 73*a* and cave 73*b*; ocean current 03*a* enters the entry Portal 73*a* and starts to unpin, open and inflate the tunnel; it is one quarter deployed.

View 29 shows the tunnel half deployed. Now the passageway-portal 73*c* is a deep cave that extends to the center of the isolated area. View 26 shows this provides access to repair 75 the infrastructure and fix the pollution 13 source. Ocean currents 03*a* continue and further open the tunnel.

View 30 shows the tunnel fully deployed. Now, the passageway-portal 73*c* is a fully inflated tunnel passage that extends through the interior of the isolated area. The tunnel provides access to repair 75 the infrastructure and fix the pollution 13 source. Ocean currents 03*a* enters the tunnel 73*a*. The environment 01 within the tunnel is continuously refreshed 77, and the current force exits 73*d*. Note that if currents 03a were from the other direction, the tunnel would have automatically inflated from the other side, and stress relief would have occurred.

Referring now View 26, alternatively, the flexible and lightweight passageway-portal 73 is easily deployed by humans, robotic submarines, etc. The tunnel characteristics provide human controlled deployment and shaping, bending and multi-point access within the interior's isolated-volume to support infrastructure system repairs 75. The passageway-portal 73 features also support its intentional easy collapse and pinned stowing when not needed.

Further, to some degree, if the force were an external explosion, the Pathway & Portal 73 might bulge inward and relief pressures; conversely, if the explosion were inside the membrane system 20, the Pathway & Portal 73 might bulge outward and relieve pressure.

Multiple Pathway-portals 73 can be integrated within the membrane system 20 including large tunnels from different directions, as well as, tunnels and smaller portals at different levels. In addition, hand-portals, full access flap-ports and openings can be added (sliced) and the edges dressed, as needed, in the membrane system 20. Depending on the situation, slices can be left open as a ready flap, laced closed, or tightly fastened.

FIG. 9 (View 31) is provided for the cover page illustration and without ship mooring cables is a simplified exemplary embodiment, without limitation, of a deployment of the architecture and processes illustrated by FIGS. 1 and 2. The embodiment illustrates systems and processes within a natural ocean environment 03 with a deep-sea drilling ship 07 and mitigation of crude oil pollution 13 resulting from a drilling oil head blowout.

A membrane system 20 is employed to isolate the pollution 13 from the natural ocean environment 03. The Interface & Base membrane-section 30 anchors and seals the bottom of the membrane system 20 to the ocean bottom and encompasses the pollution 13 emission source. The Base membrane-section 30 has a large perimeter and stands-off in distance from high-pressure pollution 13 emissions. The stand-off distance and large volume of the Base & Interface membrane-section 30 help to dissipate high-pressure emission forces (pressure, velocity, mass quantity, etc.). The crude oil pollution 13 has a molecular specific-gravity lighter than the natural ocean's 03 specific-gravity, and starts to float upward within the membrane system 20. The flexible Base & Interface membrane-section 30 is a selective-filter 28a and 28b membrane that is transmissive 28a to sea water 03 and designed to inhibit 28b crude oil 13 pollution penetration of the membrane base 30. The Base & Interface Membrane-section 30 isolates the pollution, and resists wide dispersal. The Base & Interface Membrane-section 30 is flexible and shaped to interface the isolated volume with the infrastructure including the oil drilling ship 07 and the drill shaft. Further, the Base & Interface Membrane-section 30 is shaped by bending and cross-section narrowing to initiate gentle redirection of the rising pollution away from the oil drilling ship 07. The redirection of the rising crude oil pollution 13 aligns flow vectors of the flammable pollution 13 away from the oil drilling ship 07. The resulting flow vector provides a smooth transition into the Channel 40 membrane-section.

The selective-filtering 28a and 28b enables higher-volume channeling of the rising pollution 13. With continuing emission of lighter crude oil 13 from the drilling head blowout, the selective-filtering 28a enables sea water to escape horizontally through the membrane fabric without lifting the Base & Interface 30 that is sealing and positioning the membrane system 20 to the ocean's bottom.

Sinking heavier sea water 03 within the membrane system 20 becomes a less turbulent flow and more laminar flow as sea water seeks to escape out of the bend-bottom portion of the membrane system 20. With selective filtering, lighter rising pollution 13 becomes a directed counter-current on the bend-upper portion. The selective filtering causes the crude oil pollution 13 to glob and plug the pores of the membrane fabric's upper portion, further restricting transmissive-penetration of the fabric by the rising crude oil pollution 13.

In discussion of View 31, the membrane system naturally bends down-wind and down-current, the membrane system 20 has shaping 22 and membrane fabric transmissivity 28a,b,c,d that provides general relief of ocean 03 current forces exerted on the membrane system 20.

With continued emission of pollution 13, the volume of crude oil pollution 13 and its lifting force increase within the membrane system 20. The channel 40 flow is two-way as the heavier sea water 03 sinks to lower levels and to disperse outward. Potentially, the Channel membrane-section 40 has tighter weave, smaller pore-sizes but still has selective filtering 28c and 28d. In this regard, the Channel section 40 may be less transmissive; balanced factors include the rising pollution 13 becoming more concentrated as the channel 40 narrows in cross-sectional area, substance (03 & 13) flow-vectors are established, changing depth temperature and pressure, molecular properties, etc. Within the rising crude oil pollution 13 there are entrained gases (e.g. methane) that bubble and expand as depth and corresponding pressure decrease. Additionally, in deep water there may be depth temperatures that freeze pollution and create particles and solid-chunks suspended in the flows. Rising pollution 13 flow floats upward in the channel 40, as a corresponding volume of sea water seeks to escape the Membrane system 20. While one Channel 40 membrane-section is illustrated, before deployment, there can be any number of channel 40 sections linked together in series to achieve a desired length that corresponds to a membrane system 20 and achieves a needed slant 22 and needed length for ocean 03 depth.

After channeling 40, the pollution 13 continues to rise towards the surface and into the Collect & Stabilize 50 membrane-section. Sea water 03 in the upper head is displaced. The Collect & Stabilize 50 membrane-section has little or no selective-filtering of fluids; neither sea water 03 transmissivity nor crude oil pollution 13 transmissivity is envisioned. Illustrated, the Collect & Stabilize 50 membrane-section has a portal 73b with a gas pressure relief valve to allow gas to be continuously captured and relieve pressure in the membrane system 20. Collection and Stabilization 50 further supports consolidation of pollution by depth compression forces and flow de-acceleration. When the Consolidation membrane-section 50 volume becomes 'full', it transitions to become a Hold & Treat 60 membrane-section that is still attached to the membrane system 20.

The upper sections (40, 50 & 60) are automatically extracted and inflated. Pollution 13 molecular properties including specific gravity, gaseous-pollution expansion, and selective filtering serves to consolidate the pollution 13 within, and fully-open the isolating membrane system 20. The consolidation 50 of the crude oil pollution 13 in the upper head helps lift the weight of the membrane system 20.

When the Consolidation 50 section flow has ceased, and equilibrium is attained, a dynamic-balance for the Holding 60 position is established; depth factors include:

environment forces 03 pollution lifting force of displacement, with regard to differences between sea water 03 and the crude oil pollution 13 weight & buoyancy of the membrane system 20 including shaping & position anchors 25, as well as, cables and attachments weights.

In discussion of View 31, selective-filtering 28 enables advantageous use of lightweight and flexible membrane materials. Exemplary properties, without limitation, including those of a home-prototype experiment revealing that simple fiberglass screen fabric (400 sqft weighed 9 lbs, Home Depot ~$50) may have adequate pore size. Further, based on the experiment, the fiberglass screen fabric is assessed to have strength, integrity under temperature, pressure and liquid-emersion, as well as, flexibility characteristics adequate for the Channel 40 membrane-section.

The membrane system is a recoverable and re-useable membrane system 20. After the pollution 13 is removed and transported, the membrane system 20 recovery process weighs anchors and lifts weight-chains, and then winches-in the membrane system 20 using the strength cables. (Strength cables 24 are shown in FIG. 3 View 3). Selective filtering 28 allows sea water to escape. Sections are disassembled, washed with soap and water, inspected and repaired, repackaged in encapsulation pods and are readily reconfigured and tailored in response to the next needed situation. [Perhaps several billion in return on investment, the elimination of crude oil pollution in the 5100 ft depth Deepwater Horizon casualty could potentially save ~$4 T in losses and recovery efforts; this is ~¼ the GDP of the U.S.A., and for which U.S. citizen taxes pay.]

The crude oil pollution tends to rise; standing-off from the emission forces, the membrane channels, collects and removes the crude oil.

The illustrated shallow submerged depth of the attached Hold & Treat 60 membrane-section avoids typical winds, waves, reduces sun intensity and oxidation, and helps avoid conditions that cause the pollution to spread and disperse due nature's environment. The submerged position of the Hold & Treat 60 membrane-section 60 avoids agitation entrainment of the pollution 13 within the ocean 03, evaporation of the pollution in the air, and avoids pollution penetration into porous solids (sediment, rocks, sand, etc.).

The crude oil pollution 13 is filtered 59$a$ removed through a portal 73$b$ (Discussed earlier, this port was also used to evacuate pollution gases) Pumping 59$b$ processes are also illustrated.

The consolidation head 50 and the Hold & Treat 60 membrane-section need strength, integrity and the capability to pump out 59$b$ and evacuate consolidated crude oil pollution 13, potentially at the rate that the crude oil head blowout emits the pollution 13. The casualty may require a supertanker on-scene (Deepwater was 87 days) for stowing crude oil and eventual transport of the crude oil (formerly pollution) now, a natural resource to refineries.

As shown, the consolidated crude oil pollution 13 within the Hold & Treat 60 membrane-section can be draw-string detached 63$a$. Also shown, is a tied-off, detached, and separated pollution 'full' and renamed Hold & Treat 60 system & process.

Shown in FIG. 9 View 31 equilibrium of a separated Hold & Treat 60 membrane system that is full of consolidated crude oil pollution 13 is held at a submerged depth. This equilibrium depth is adjustable to advantage, including avoidance of cyclonic conditions (hurricane, funnel spouts, tornadoes, etc.) and other severe weather; as well as, providing ocean 03 depth for sustaining pressure-force for consolidation.

FIG. 9 shows, a separated Hold & Treat 60 membrane system that is ~20 meters in diameter. If 'full' of pollution, the crude oil consolidation may have tons of buoyancy (floatation displacement), and attached is a cable 22$b$ and an anchor 25.

Both the detached and attached Hold & Treat 60 membranes enables dynamic evacuation of the consolidation head. As labeled in FIG. 9 View 31, the membrane system 20 consolidation head has a portal 73$b$ that enables pumping 59$b$ of the crude oil 13 into a ship 07.

As discussed in FIGS. 1 and 2, this supports subsequent transport 83 and Use-Value and Substance Initiatives 80, 84 and 87. In addition the environment 01 is substantially easier to restore and remediate 95

FIG. 10 (View 32) is another embodiment of a deployment of the architecture and processes illustrated by FIGS. 1 and 2. The embodiment illustrates systems and processes that use a membrane system 20 within an air atmosphere environment 02 to mitigate a hazardous gas situation. Illustrated, without limitation, is a subterranean-pocket gas leak of $CO^2$ pollution 11 resulting from geological fracking of shale.

Concentrated $CO^2$ 11 has a specific-gravity that is heavier than natural atmospheric air 02; while $CO^2$ gas is a constituent of atmospheric air 02. The $CO^2$ pollution-concentrations 11 is deadly to humans and other mammals.

Based on geological risk assessments, an isolating membrane system 20 is positioned on the ground and readily deployed by unmanned aerostats 46$h$ to protect a urban infrastructure 06. Upon deployment, the aerostats 46$h$, held in position by mooring-anchors 25, lift and suspend the membrane system 20 and separate the asphyxiant gas pollution 11 from the natural air environment 02 to mitigate risk to the nearby urban area 06. The membrane system's 20 inner-volume isolates the concentrated $CO^2$ pollution 11.

Alternatively, the membrane system 20 deploys, isolates and protects a benign natural environment 01 encompassing the nearby village 06 at risk.

The asphyxiant $CO^2$ 11 settles and naturally consolidates at the ground surface. Without the membrane system 20 the $CO^2$ 11 would pocket in low lying areas where the village exists, and over time dissipate and be entrained into the air atmosphere.

A membrane system 20 is deployed and the Base & Interface 30 membrane section, including the perimeter anchor-weight seal 23, Channeling 40 membrane section, Collect & Stabilize 50 membrane section, Hold & Treat 60 membrane section have processes that work to isolate the concentrated heavier-than-air $CO^2$ 11 that settles to the surface 04. The membrane system 20 maintains the concentration 11 in a safe area. Mitigation entails holding 60 methods that maintain $CO^2$ concentrations 11 in an isolated and safe manner, and further processes that control the rate of transmissive leakage at an acceptable rate into the air atmosphere 02 through the selective-filter 28. Porosity, transmissivity 28 and leakage of the membrane system 20 enables dissipation 33 into the air atmosphere 02 at a controlled rate.

$CO^2$ is less than 1% of the mix of natural atmosphere air 02; although still concentrated, when $CO^2$ pollution concentrations 11 are safely dissipated such that concentration in atmospheric air is less than 7%, the risks of suffocating have been significantly reduced, and the atmospheric air 02 threat has been significantly reduced and remediated 76.

The deployment period depends on the amount, time and rate at which the volume of $CO^2$ pollution 11 is emitted from the subterranean gas-pocket and dispersed into the atmosphere 02. Pathway-portals 73 enable additional processes, including search and rescue, analysis and testing, fissure sealing and closure, infrastructure repair 75 and other functions to mitigate risks. Hand-portals 73a provide access ports to seal a geological fissure and install 75 containment and piping systems to vector the asphyxiant to a safe remote location and other follow-on processes.

FIG. 11 (View 33) is, yet, another exemplary embodiment, without limitation, of a deployment of the architecture and processes illustrated by FIGS. 1 and 2. The embodiment illustrates systems and processes that use a membrane system 20 within an air atmosphere environment to fight and extinguish a fire 18. Illustrated is a fire 18 on an oil derrick 08 at sea. (A fire on land may also be similarly extinguished using the illustrated embodiment.)

The membrane system 20 is suspended by balloons, aerostats, and air vehicles 46b that are attached to mooring-anchors 25. The aerostats include those unmanned and reactively deployed. The exemplary embodiment, without limitation, has a membrane made of the same reflective polymer that firefighters currently fold and carry in a pouch to provide a reflective heat and fire protection blanket; the material is manufactured in threads, spun and woven to provide cord-strength and fabric integrity. Lightweight and flexible, the membrane system 20 blocks air feeding the base of the fire, as well as, reflects heat and flames of the oil drilling rig fire 18. The base interface is shown with quick-clamp 32 weights. The weighted 32 base is slightly submerged, and the membrane system 20 is sealed to hold combustion $CO^2$ inside the membrane system, and air 02 with oxygen outside the membrane system 20.

(Without the firefighting membrane system, in the 2010 Deepwater Horizon BP crude oil casualty, the derrick fire finally extinguished when the derrick capsized and sank.)

Referring now to FIG. 3 and FIG. 11, these crude oil pollution membrane system 20 in an ocean, and the fire fighting membrane system 20 in air have different characteristics; yet, they can be simultaneously employed.

In FIG. 11, two fireboats 07 continue to work to cool fire through the membrane system 20 by using passageway-portals 73. The membrane 20 with small portal 73 openings is designed to resist inward atmospheric air 02 feeding the fire; atmospheric air 02 that does draft-feed combustion, accelerates and advantageously disperses the cooling spray streams from the fireboat 07 nozzles.

The membrane system 20 further enables intentional flooding of the inner volume with cooler consolidated $CO^2$ 68 that displaces combustion oxygen inside the membrane system's 20 atmosphere 02.

Referring now to FIG. 2, this $CO^2$ substance is a $CO^2$ treatment 68 versus $CO^2$ Pollution. The treatment 68 can be any appropriate firefighting gas or liquid.

Now referring to FIG. 11 View 33, the Membrane system 20 snuffs the fire by insertion of cool $CO^2$ 68 and other fire fighting substances. Firefighting substance has delivery piping 49 connected to stiffening-tubes 26 that are integrated in the membrane system 20 fabric. The stiffening-tubes 26 support delivery of cool $CO^2$ 68 and firefighting substances from the aerostats 46b to appropriate locations, and compensate for rising combustion flue-gases 12 that would heat and prematurely eject the firefighting $CO^2$ 68, if dumped into the membrane system 20 from the aerostats 46b.

The $CO^2$ treatment 68, delivered at the base, effectively snuff the fire by further denying the fire combustion oxygen. It also provides a protective blanket for flammable crude oil pollution 13 rising from the oil head blowout casualty and feeding the flames. Further, $CO^2$ treatment 68 denies oxygen to the flammable gas pollution 11 (e.g. methane) that is also expanding and bubbling up underneath the oil drilling platform 08.

FIG. 12—View 34 is, yet, another exemplary embodiment, without limitation, of a deployment of the architecture and processes illustrated by FIGS. 1 and 2. The embodiment illustrates systems and processes that use a membrane system 20 within an environment 01, including an air atmospheric environment 02 and a liquid environment 03, to mitigate solid radioactive particulates pollution 15, including airborne vectors 12 (smoke and steam plumes) of solid radioactive particulates, and waterborne vectors 14 of solid radioactive particulates.

In low concentrations radioactive isotopes exist in the atmospheric air, in liquids (oceans and freshwater sources) and in solids (soil, rocks, dust, etc.). Higher concentrations of radioactive pollution present a toxic hazard.

Gases: radioactive gases 11 have fluidity, and if unconstrained, they widely disperse to reduce concentration and toxicity. The radioactive isotopes 19 excite and heat the gas 11 molecules. With the radioactive isotope 19 as an integrated heat-source, radioactive air 11 tends to rise, stay aloft and widely disperse in the upper atmosphere. As shown, the membrane system 20 is less concerned with radioactive gas 11.

Liquids: Radioactive liquids 13 also have fluidity, and in large bodies of water, soluble radioactive liquids disperse to reduce concentrations and toxicity. When not dispersed in a large body of water and when the radioactive isotopes 19 concentrated on the surface and floor of the ocean, liquids 13 can carry the radioactive isotope 19, percolate 13a through sediment (solids), and can pool in hazardous concentration in geological aquifers. The illustrated membrane system 20 works to isolate the percolation vector 13a in the cooling pod 07 when hazardous concentrations exist.

Solids: With emphasis, the membrane system 20 concentrates on mitigating radioactive solids 15. Radioactive solids 15 are most problematic and their vectors include those of airborne 12 radioactive smoke, dust, and steam, and liquid-borne 14 radioactive solid particles, including those in cooling fluids, firefighting runoff, structural wash-down, as well as, precipitation.

Whether heavy particles or lighter dust, the radioactive solids create fallout 15; the fallout 15 collects on surfaces and the ground where biosphere life is most prevalent. On surfaces and the ground, the radioactive isotopes touch and are ingested in biological forms including animals and plants. Without dispersal, toxic fallout 15 radioactivity exists for several half-lifes (Depending on the radioactive element several billion to several million years). Dissipation of surface radioactive fallout 15 by wind, by traffic and with ingestion by plants and animals poses significant hazards, and hazardous conditions can linger for several decades to hundreds of years.

Shown in FIG. 12—View 34 is a nuclear power plant casualty with radioactive pollution, including air vectored radioactive particulates 12 such as smoke, soot and steam. The radioactive molecules and particulates rise in altitude as a result of explosive blasts, secondary fires and radiation heat. The heated molecules ride on flue gases and air turbulence.

Once outside the immediate vicinity of intense radioactive heat, secondary fires, tank bursts and blasts, the radioactive substances cool and the heavier solid particulates, descend in altitude and fallout particles 15 (solids) settles on infrastructure surfaces, and to the ground and water surfaces.

FIG. 12—View 34 shows that as the airborne radioactive particles 12 rise, the radioactive particles 12 are captured in a collection frame 60 by deployed filters 66 and treatments 67*a,b,c*. The radioactive particles are also captured by treatments in the membrane system 20 fabric-skin.

The membrane system 20 inhibits radioactive isotopes dispersal, and uses the entire surface area of the membrane fabric to collect, consolidate, and bind radioactive particulates in filters 66, and to adhere, molecular-shield and encase 67*a,b,c* the particulates.

Some radioactive particles cool and descend and become fallout 15 that collects on structural surfaces and the ground within the membrane system's 20 inner volume. Fallout 15 is captured in the membrane system floor-base 38 covering the ground terrain, and on the top surface of the membrane-section 27*a* that covers the cooling pond 07.

Also, radioactive fallout that settles on structures is washed-off; the runoff is channeled into facility hardscape culverts that carry waterborne radioactive particulates 14 to the cooling pond 07. The cooling pond 07 has membrane fabric on its top surface 27*a*, bottom 27*b* and sides.

The cooling pond membrane system floor-base 27*b* collects runoff and inhibits percolation through the sediment and rock to subterranean aquifers. The cooling pond top-membrane 27*a* floats on top of the pond and both catches fallout 15, as well as, inhibits evaporation of collected liquids with concentrated waterborne radioactive substances.

The membrane system 20 works to isolate, collect 50 and enable sequestration of radioactive solids 15, including airborne radioactive particulates 12, liquid-borne 14 radioactive particles, and radioactive fallout 15 which has been contained within the membrane system 20

Radiological containment applications include, but are not limited to nuclear power plant incidents, radioactive material shipping accidents, radioactive material processing casualties, terrorist dirty bomb explosions, and other radiological hazards that threaten the environment and biosphere.

FIG. 12 View 34 illustrates a nuclear power plant reactor 06*b* casualty, other reactors 06*a,c,d,e,f* are also at risk, but have not yet failed. (The layout corresponds to the Fukijima Nuclear Power Plant and reactors 1,2,3,4,5,6) In this regard, to avoid illustration-clutter, View 34 addresses containment of only the initial reactor to fail, 06*b*. Nevertheless, RAD-HAZ containment for all site reactors can be concurrently operational by independent membrane systems 20 operating side-by-side, or in collective groups, or by an integrated large membrane system 20.

Focusing on airborne radioactive particles 12, waterborne radioactive particles 14, and surface fallout 15, the membrane system 20 isolates the radiation pollution hazard. The Membrane system 20 reduces the natural spread of the radiation hazard, consolidates the radioactive particles (12, 14, and 15) and focuses radiation hotspot mitigation within a localize volume.

The membrane system 20 uses the nuclear power facility architecture 06 that was installed in plant construction, including hardscape sewers, culvert ditches, road crowns and curb runoff to capture leakage of pipes and tanks, as well as, fallout 15 in firefighting runoff and wash-down of the facility 06*b*. Fallout 15 becomes waterborne solid particulates 14, and is flushed in liquid runoff channeled to the cooling pond 07.

Radioactive isotopes 19 do not have appreciable weight or a specific-gravity. However, the radioactive isotopes radiate energy that impart heat and changes the density of molecules. In concentrations, these changes are significant and can be used to distinguish and manage radioactive matter. The membrane system 20, therefore, directs and channels 40 the dispersion vectors, including airborne 12 and waterborne 14, radioactive particulates 15. These include:

1.) The membrane system 20 reduces cross-flow winds 02*a* and 2*b* and blocks water seepage.

2.) Airborne 12 radioactive particle vectors are initially rising flue gases and blasts. Management of these airborne vectors is integrated within the membrane system 20.

3.) Surface fallout 15. Initially, solid radioactive particulates are carried in heated air turbulence and flue gases expand and rise. Then, with altitude and distance from the radioactive core and secondary fires, the air becomes less turbulent, cools and solid particulates fallout of the flue. Gravity causes the radioactive particulates to float to the surface. The radioactive surface-fallout 15 is contained within the membrane system 20.

Further the surface structures on which the fallout 15 settles are washed, and the fallout 15 becomes waterborne. The wash-down drainage is vectored to the cooling pond 07, where it is further managed.

As illustrated in FIG. 12 View 34, aerostats 46 support a Membrane system 20 deployed to encompass the radioactive pollution source 19 source. The membrane system 20 is comprised of a Base & Interface 30 membrane-section, Channel 40 membrane-section, Collect & Stabilize 50 membrane-section, and Hold & Treat 60 membrane-section.

The Base & Interface 30 membrane-section stands-off in distance from the reactor casualty (radioactive core meltdown) and nearby secondary fires. The perimeter encompasses the radioactive emission, including fire flue gases, steam and other carriers. The Base & Interface 30 membrane-section seals the ground interface. A chain-weight 23 seals the bottom of the membrane system and its interface to the ground. Strength cables 24 and stiffening tubes support vertical and horizontal integrity of membrane-sections (30, 40,50,60).

View 34 shows strength cables 24 that not only provide strength but also shape 22 the membrane system 20 and accommodate external coastal wind patterns 02 that preclude the membrane fabric from collapsing into its interior volume. Aerodynamic shaping 22 provides a knife-edge to split the wind and enable the wind to slip around the membrane system 20. Furthermore, the aerodynamic shaping accounts for wind direction reversal (both directions have a leading knife-edge), to account for diurnal wind shifts that typically blow from the sea-to-land 02*a* during the day and reverse to blow from land-to-sea 02*b* at night. In addition, Path &Portals 73 integrated to the Base & Interface 30 membrane-section enable penetration of the Membrane System 20 for search & rescue, to control operational and emergency shutdown systems, to make repairs, and mitigate risks in the interior environment.

The sections have some common features, including flexible strength cables 24 that shape 22, and strengthen the membrane system 20 and support its vertical stretch. In addition they have flow tubes that enable delivery of fluids (gases and liquids), as well as, stiffening-tubes to further shape 22 the membrane system 20.

The channel 40 membrane-section manages flow of hot rising effluents, including radioactive airborne 12 soot and smoke, and steam in the inner volume The Collect & Stabilize 50 membrane-section receives the radioactive effluent, which is still rising, but cooling. Based on thermal loading from core meltdown, secondary fires, and the radioactive isotopes 19 within the effluent, the cooling heavier particulates start descending, cooling lighter particulates float and ride flue currents.

The Hold & Treat 60 membrane-section is a frame 60 with lightweight replaceable filters 66 and treatment plates 67a,b and 67c. The lightweight frame 60 may further have exhaust fans that pull air with radioactive effluents through the filter 66 & treatment 67a,b and 67c plates. The lightweight frame is populated with removable plates, including filter plates 66, adherent plates 67a,b and molecular binding & treatment plates 67c.

As shown in View 34, the filter and treatment plates can be removed 79 when effectiveness dictates; spent plates that are full of radioactive particles can be advantageously relocated.

The drawing further shows Attach & Detach 63 features in which two helicopters remove and replace a molecular binding & treatment plate 67c.

In addition, radioactive particulates are also directly captured and treated across the entire interior surface area of the membrane system 20 fabric.

Of note, the filters and treatments (66,67a,67b,67c) are not intended to permanently shield radioactivity for sustained work, but rather to temporarily capture and stabilize radioactive particles, bind and adhere the particles into a form that they are molecularly-shielded and safer to emergency crews. Further, the treatments enable consolidation and subsequent transport and sequester initiatives.

The flexible, lightweight membrane system 20 can be shaped to advantage, including multiple vertical elliptical columns that readily isolate an individual or a group of injured reactors 06, as well as, shaped to relieve wind 02 stresses, including prevailing daily diurnal wind shifts.

Referring now to FIG. 2, flexible and lightweight features supports incremental removal of a used radioactive membrane system 20. These features support compaction and transport 83 and enable follow-on initiatives to sequester 88 the radioactive pollution 10. After removal, the contaminated membrane system 20, is transported to a small, secure, isolated, remote location. Removal supports remediation 76 and 77 of the environment, as well as, restoration 92 of facilities and infrastructure, including safety systems.

FIG. 13 provides six views (View 35,36,37,38,39,40) of an exemplary embodiment, without limitation, of features of membrane system 20 that mitigate a radiological hazard, and specifically addresses exemplary details of the membrane system 20 for mitigation of radioactive emissions from a nuclear power plant casualty (discussed in FIG. 12). FIG. 13 supports the architecture and processes illustrated by FIGS. 1 and 2.

FIG. 13—View 35 illustrates the portion of the membrane system 20 that is enlarged in View 36.

FIG. 13—View 36 is an enlarged view of the Base & Interface 30 membrane-section to mitigate a radiation hazard at a nuclear reactor 06b. The illustration is truncated to reveal a three-dimensional cutaway that supports shaping 22 for wind currents in coastal areas with daily diurnal wind shifts. (FIG. 12 shows the diurnal wind currents 02a and 02b.) In addition, the membrane system 20 base has a anchor-weight 23 to help establish and maintain its shape.

The illustration (View 36) additionally shows the membrane system 20 has a horizontal surface component 27 to collect fallout on both the ground surfaces and the surface of the cooling pond. The fallout 15 is collected on horizontal surfaces. The horizontal surface components of the membrane system 20, include the buildings, structures, roads and drainage systems. The drawing further shows that the facility lawns, dirt and bare grounds are covered by an anti-percolation membrane 38 that catches some fallout, as well as, wash-down runoff. The facility is washed and liquid runoff, containing radioactive particles, is captured in hardscape-drainage, and then vectored to the cooling pond 07.

View 36, the drawing shows the membrane fabric has treatments that shield 67a, bind 67b and encapsulate 67c radioactive isotopes 19 and airborne 12 particles. The treatments are integral to the fabric (washed into the fabric) and support containment, shielding and encasement, as well as, removal of the toxic radioactive particles 15 when the membrane system 20 is removed.

FIG. 13—View 36 depicts the exemplary embodiment, without limitation, of a pathway-portals 73 that proceeds from the natural environment 01 outside the membrane system 20 to a building (Reactor #2). The pathway-portal 73 enables safer access into the interior, including passage into building interior-hallways and rooms in a monitored and more benign environment. The pathway-portals 73 support access, repair and restoration of systems within the nuclear power plant grounds, and into structures and buildings.

View 36 also shows the portion of the drawing that is further enlarged (and cutaway) in View 37 to show Pathway & Portal 73 features.

FIG. 13—View 37 is an enlarged view of the flexible pathway-portal 73. Shown is a pathway-portal 73a that proceeds from the natural environment outside the membrane system 20 to a building 06b. The pathway-portal 73 enables safer access into the interior of the membrane system 20. The illustration further shows continuation of the passage within a building hallway and to the reactor control room 06c. The pathway provides a monitored and more benign environment. The pathway-portals 73 support access, repair and restoration of systems within the nuclear power plant grounds, and into structures and buildings, including hall and rooms.

Lightweight and flexible, the pathway-portal 73 has characteristics providing easy deployment. It is shown spooled on a membrane-deployment roll 29 that is easily unrolled by hand, or unspooled from a dolly-hand-truck or motor-assisted cart.

The passageway-portal 73 extends the membrane system 20 isolation and embedded treatments including fan-assisted filters 66a at intervals along the pathway tunnel including both zones outside the building 06b and inside the building 06b. Furthermore, adherent 66b treatments (e.g. tacky adhesives) collect radioactive particles on the pathway's fabric skin 73a,b,c and 74a,b,c. In addition the membrane fabric treatments 67a,b,c extend from the external environment to the reactor building 06b and continues in the tunnel 74a,b,c to the reactor control room 06c.

Referring now to FIG. 12 View 34 the exemplary treatment embodiments include, without limitation:

Filters Treatment 66: These filters are large size HEPA filters that are specifically designed to capture dust and small airborne particulates.

Adherent Treatments: The adherent plates have resin coatings designed to capture dust, soot and smoke particles; the adherents may be tacky substances, including those with phased application. The phased application supports membrane-section 30,40,50 packaging, stowage and rapid deployment without a sticky substance, followed by tacky adhering properties at employment. (This phase application is similar to adding resin-hardener to epoxy, yet unlike epoxy, the application treatment enables the operational-adherent to remain tacky-soft to capture and bind radioactive particles over the operational employed timeline.)

FIG. 13—View 38, 39 and 40 address molecular treatments. The treatments (67a,67b,67c) are not intended to protectively shield radioactivity; typically mass (i.e. a lead shield) is used to shield radiation. Rather, the treatments temporarily shield, capture and stabilize radioactive particles, bind and adhere the particles into a form that they can be consolidated, then subsequently transported and eventually sequestered. These treatments are supported by energy turbulence, heat, carbon soot and steam present in the radioactive flue gas.

In addition to filtering (shown in FIG. 12 View 34) and tacky glue-like substances, exemplary molecular and chemical treatments, without limitation, include:

FIG. 13—View 38 The treatment may also contain binding processes such as chelation 67*a*. Chelation wraps molecular-structures and insulates them to control their release. While chelation is often used to slowly release medicines and vitamins, the proposed chelation does not dissolve (like medicines) but rather slows or arrest the release of radioactive emission.

FIG. 13—View 39: The adherent processes may also include polymer-strings 67*b* to further bind the chelated radioactive particles. While dust, soot and smoke particles do not readily molecularly-bind to each other, the chelate insular-shield (discussed in View 38) is bindable. Chelated molecules can be strung together in long molecular strings to further collect, consolidate and shield the radioactive particles.

FIG. 13—View 40: In addition, illustrated is a $C_{60}$, buckminsterfullerene (Buckyball), molecularly-encasing a radioactive isotope in a carbon-effluent molecule. Micro-encapsulation, micro-shielding and molecular binding of radioactive particles include processes to close the outer electron-valence ring in a tightly-held-molecule that consolidates shields, and binds the molecules, in which radioactive isotopes are contained within.

In Views 38, 39, 40 the initial phased-application of Buckyballs, chelation substances, adherents, catalysts, etc. can be washed within the membrane fabric, impregnated in the flexible material, dusted, sprayed and otherwise applied. The catalysts include, but are not limited to, chemical additives, thermal binding processes, radiation binding processes, chemical lattice structuring, friction-flows, as well as, other processes. (The membrane system is seeding the fabric to derive an advantageous benefit to the environment by using the abundance of hot carbon soot, smoke, steam, radioactive energy, as well as, other substances and energetic forces.)

Collectively, FIG. 13 presents features that provide an exemplary embodiment, without limitation, that enable consolidation of the radioactive pollution into a small volume, that arrest contamination spread, that support removal of radioactive matter, and that mitigate risks to the infrastructure and the environment 01.

In exemplary embodiments, the overarching objective is to consolidate the radioactive pollution into a small volume, to arrest contamination spread, to support removal of radioactive matter, and mitigate risk to the infrastructure 06, the environment 01, and to emergency response personnel. While working the situation, the membrane system 20 supports containment, encapsulated shielding, and ultimately removal of the toxic radioactive substances, as well as, preservation of environment and infrastructure systems The processes and systems described herein can be repeated so as to provide multiple isolations membrane systems, including where membrane system are side-by-side, as well as where one membrane system is encapsulated by another membrane system, including providing capabilities for maintaining isolation and other process while renewing and refreshing a deployed membrane system 20.

SUMMARY (ALL VIEWS)

Easily understood, the exemplary embodiments, without limitation, illustrate membrane systems which integrate, across a broad spectrum to contain pollution and hazardous energy. The membrane systems inhibit natural dispersal, unfettered dissipation, biosphere adsorption and absorption. The membrane systems mitigate the effects within the environment and protect human developed infrastructures. The pollution, once a natural resource, is captured by the membrane system, and to the extent possible, collection and consolidation enable follow-on processes and its reclassification back to a natural resource.

The exemplary embodiments illustrated methods and processes that enable readily deployed membrane systems. The membrane systems are encased in pods, launched and semi-autonomously deployed at incident occurrence, as well as, pre-positioned in ready, weather-able pods as a safety measure.

Whether part of a fixed installation or provided by mobile emergence response, the membrane system is tailored to the environment and, as appropriate, can be deployed real-time (a.) from the surface with launching systems (b.) by inflation of unmanned aerostats and balloons, (c.) by mobile air vehicles, including aircraft, helicopters, blimps and other air vehicles, (d.) at the water surface by ships, floating vessels and platforms and (e.) by subsurface fixed and mobile systems.

The disclosed invention reduces risks; there are no/few human interactions in the membrane systems and methods presented. Pathways for robotic and safer human access are addressed.

While there would be additional advantages in 'active' controls in membrane system processes and in system-level capabilities the membrane systems use, when ever possible, the forces of nature to deploy and operate. The illustrated membrane systems have few requirements for communications, power, computers, motors and articulated devices.

Time sequences and situation capabilities are managed by local system-sensors inside the membrane systems (e.g. pressure relief valves, pressure sensors, strain gauges, timers etc.) Further, capabilities are integrated within design features (e.g. selective filtering, buoyancy devices with bursting and dissolving encapsulation, depth pressure gradients, pressure relief valves, ocean currents, thermal expansion, wind currents, flue eddies, fluid dynamics and other molecular properties, etc.)

The membrane systems are designed to integrate processes that remove the captured pollution, mitigate risks and reduce immediate hazards. Objectively, the membrane systems enable integrated 'passive' system-control in pollution incidents and hazardous energy crisis, including environment isolation, and substance direction, channeling, collection, removal; and in the case of fire hazard (hazardous energy), its elimination and in the case of radiological hazard (both hazardous energy and pollution), its encapsulation-shielding.

Once the base is set, the threatened infrastructure might be totally evacuated of personnel with the membrane system operating without people, without power sources, etc.

Autonomous operations might continue until pollution substances are at capacity ('full'), or are removed and follow-on activities are initiated.

Enabled by the membrane system 20 (Referring to FIG. 1), human interactions are integral in follow-on processes including Repair and Restore 70, Use-Value Processes and Substance Initiatives 80, and Recovery and Restitution 90 of the biosphere and infrastructure. In this regard the membrane system 20 enables a host of other patent inventions.

Initially, the pollution substance was a resource with user and market value. Referring to FIG. 2, when pollution is collected and consolidated 50, removed and transported 83, its refinement 85 to a useful resource is enabled. Alternatively, the pollution can be sequestered 87 and hazards eliminated 88. Hazard elimination includes extinguishing the fire, safe dissipation of concentrated gas (e.g. $CO^2$, and sequestration of radiation hazards).

Attached are 4 tables for CPHE (Methods and Systems to Contain Pollution & Hazardous Environments)

Table 1 is an organization tree of CPHE invention Claims, and correlates associated Callouts Table 2 provides an integrated numbering of all Callouts and also correlates FIGURES and Views.

Table 3 is an integrated tabulation of the numbering and purpose of FIGURES and Views.

Table 4 is a tabulated assessment of Prior Art in relationship to CPHE. The assessment is shown in four sub-table categories:
  a. Crude Oil Pollution containment
  b. Toxic gas mitigation —$CO^2$ from fracking
  c. Fire fighting—Oil drilling derrick
  d. RADHAZ mitigation (Fukijima)

The prior art was not used in developing the disclosed CPHE invention. However, after the prior art research, it is assessed that earlier patented technology would itself be enabled by CPHE, in the majority of cases.

In this regard, large scale incidents need to be addressed. Examples, without limitation:
  a. Oil Pollution Deepwater Horizon Magnitude:
    Skimmers would be effective only at the edges, lest they choke on the volume of pollution. CPHE would make them more effective over a larger area.
    Microbe treatments would be overwhelmed without CPHE.
    U.S. Pat. No. 8,534,365 B2 (Dighe) is a good invention but is vertically lowered by a crane-barge, and lacks tilt-slant. It does not isolate the environment. Without shaping that offsets the pollution, the crane-barge is floating in an ocean of flammable pollution. The open canopies would allow pollution to sip out, if tilted. Consideration for infrastructure (moorings, shaft, pylons) was not apparent. CPHE has a significantly different approach.
  b. Toxic Gas from a Fracking Fissure
    U.S. Pat. No. 0,075,653 A1 (Nolt) prior art is a good invention, but limited and not rapidly deployed. Nolt's pollution prevention was associated with early construction installation of a berm, a containment trench and a horizontal surface membrane; all in the vicinity of the spot where vertical shaft penetration occurred. While this seemed to satisfy a state government drilling requirement, with horizontal impact drilling (shown in other fracking patents) that extends over a wide area (perhaps a mile), where will the fissure leak occur? A readily deployed emergency response CPHE seems appropriate. CPHE has a significantly different approach.
  c. Large Infrastructure Fire Extinguishing
    Firefighters heroically fight at the edges; CPHE is an integrated fire fighting invention that fights fire at the fire-triangle core (fuel, oxygen, heat)
    U.S. Pat. No. 0,067,600 A1 (Bourakov) prior art is a good invention and is rapidly deployed. Bourakov's helicopter-borne wildland fire extinguishing blanket smothers fire. It was not apparent how Bourakov's invention could be used to protect buildings, derricks and other infrastructures with a vertical component as this would lift the blanket. In addition, Bourakov's invention worked to smother the fire (one-side of the fire-triangle) and lacked fluid substances to cool the fire and deny the fire fuel. CPHE not only block the combustion air, but also inserted into the isolated volume $CO^2$ that served to deny the fire a fuel-interface.
    CPHE has a significantly different approach.
  d. Radiation Hazards Prior Art Addresses Small-Scale Radiation Hazards that are not Rapidly Deployed
    Mass-density room and vessel shielding and methods
    Human exposure medical treatments
    U.S. Pat. No. 0,270,046 A1 (Bertolotto) is limited by how high water can be sprayed. After sprinklers spray water that capture radioactive substances, where does the radioactive liquid-runoff go? CPHE has a significantly different approach.

As used herein, an element or step recited in the singular and proceeded with the work "a" or "an" should be understood as not excluding plural elements or steps unless such exclusion is explicitly recited. Furthermore, references to "embodiment" of the present invention or "exemplary embodiment" are not intended to be interpreted as excluding the existence of additional embodiments that also incorporate the recited features.

The description of the different advantageous embodiments has been presented for purpose of illustration and description, and is not intended to be exhaustive or limited to the embodiments in the form disclosed. Many modifications and variations will be apparent to those of ordinary skill in the art. Further, different advantageous embodiments may provide different advantages compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for inhibiting the spread of pollution within a fluid including a current flow, comprising the steps of:
    providing pods each releasably confining a corresponding membrane-section;
    deploying a base membrane-section, said base membrane-section including an edge;
    deploying harpoon-anchors each including an eyelet;

deploying said pods into said fluid to drift along with said current flow;
connecting tension-cables to a perimeter anchor weigh;
slipping said tension-cables through said harpoon-anchor eyelets;
encompassing said pollution with said base membrane-section;
providing un-inflated stiffening-tubes each including a penetration-slit that enables a vertical shaft to penetrate said base membrane-section;
pinching said shaft;
closing said slits;
inflating said stiffening tubes;
deploying a shaping anchor provided with another tensioning cable;
attaching said another tensioning cable to an upper portion of said base membrane-section; and
lowering an edge anchor onto said edge of said base membrane.

2. A method according to claim 1, wherein:
said pollution comprises matter emitted from a well bore in the course of an oil well spill; and
said shaft includes a drilling shaft.

3. A method according to claim 1, wherein:
said pollution comprises radioactive matter.

* * * * *